United States Patent
Yakita

(10) Patent No.: US 8,576,494 B2
(45) Date of Patent: Nov. 5, 2013

(54) ZOOM LENS SYSTEM

(75) Inventor: Shinichiro Yakita, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 173 days.

(21) Appl. No.: 13/299,396

(22) Filed: Nov. 18, 2011

(65) Prior Publication Data

US 2012/0127587 A1    May 24, 2012

(30) Foreign Application Priority Data

Nov. 24, 2010  (JP) ................................. 2010-260974

(51) Int. Cl.
*G02B 15/14*  (2006.01)
*H04N 5/262*  (2006.01)

(52) U.S. Cl.
USPC ........................................ 359/686; 348/240.3

(58) Field of Classification Search
CPC ... G02B 15/17; G02B 15/173; G02B 27/0062
USPC ...................... 359/683, 686, 687; 348/240.3
See application file for complete search history.

(56) References Cited

U.S. PATENT DOCUMENTS

| | | | |
|---|---|---|---|
| 5,737,128 A | 4/1998 | Usui | |
| 6,940,656 B2 | 9/2005 | Oomura et al. | |
| 7,982,971 B2 * | 7/2011 | Nakamura | 359/688 |
| 8,223,224 B2 * | 7/2012 | Sakamoto | 348/240.3 |
| 8,223,440 B2 * | 7/2012 | Wakazono et al. | 359/686 |
| 2004/0169934 A1 | 9/2004 | Oomura et al. | |
| 2012/0224270 A1 * | 9/2012 | Sakamoto | 359/688 |

FOREIGN PATENT DOCUMENTS

| | | |
|---|---|---|
| EP | 0752605 A2 | 1/1997 |
| JP | 9005628 A | 1/1997 |
| JP | 2004264458 A | 9/2004 |

OTHER PUBLICATIONS

Gross, H ED "Handbook of Optical Systems, Chromatic Aberrations", Jan. 1, 2007, pp. 268-289 XP002619942. Cited in EP EESR in counterpart appln. No. 11009065.1, dated Feb. 21, 2012.

Extended European Search Report issued in counterpart application No. EP11009065.1, dated Feb. 21, 2012.

* cited by examiner

*Primary Examiner* — David N Spector
(74) *Attorney, Agent, or Firm* — Rossi, Kimms & McDowell LLP

(57) ABSTRACT

A zoom lens system includes a first unit having a positive refractive power, a second unit having a negative refractive power that moves for magnification-varying, a third unit having one of a positive refractive power and a negative refractive power that moves for magnification-varying, and a fourth unit having a positive refractive power.

6 Claims, 10 Drawing Sheets

C-LINE, F-LINE    g-LINE

ZOOM LENS SYSTEM

BACKGROUND OF THE INVENTION

1. Field of the Invention

The present invention relates to a zoom lens system which is suitable for use in a broadcasting television camera, a video camera, a digital still camera, and a silver-halide camera, and also to an image pickup apparatus including the zoom lens system.

2. Description of the Related Art

Conventionally, as a zoom lens system used for an image pickup apparatus such as a television camera, a silver halide film camera, a digital camera, and a video camera, there is proposed a zoom lens system including, in order from the object side, a first lens unit having positive refractive power and including a focus unit, a second lens unit having negative refractive power for magnification-varying, a third lens unit having positive or negative refractive power for correcting image plane variation due to the magnification-varying, and a fourth lens unit having positive refractive power for image formation.

Japanese Patent Application Laid-Open No. 2004-264458 discloses a zoom lens system in which the third lens unit has a positive refractive power. Japanese Patent Application Laid-Open No. H09-005628 discloses a zoom lens system in which the third lens unit has a negative refractive power.

Japanese Patent Application Laid-Open No. 2004-264458 discloses a technology for appropriately correcting longitudinal chromatic aberration in particular by defining a refractive index, an Abbe constant, a shape, or the like of the first lens.

Japanese Patent Application Laid-Open No. H09-005628 discloses a technology for realizing a zoom lens system with small spherical aberration and chromatic aberration in particular by defining a structure of positive and negative lenses in the first lens unit and an Abbe constant thereof.

However, there is a problem that if it is intended to correct longitudinal chromatic aberration due to an increase in a focal length at a telephoto end because of a higher magnification ratio or to correct further longitudinal chromatic aberration on the telephoto side in the already disclosed zoom lens system, it is difficult to correct the longitudinal chromatic aberration sufficiently by the conventional technology.

SUMMARY OF THE INVENTION

In view of the above, an object of the present invention is to provide a zoom lens system that is optimal for a high magnification zoom lens system for broadcasting in particular, and can appropriately correct secondary spectrum of longitudinal chromatic aberration on a telephoto side while achieving a small size and light weight, and to provide an image pickup apparatus including the zoom lens system.

In order to attain the above-mentioned object, according to the present invention, there is provided a zoom lens system, including, in order from an object side; a first lens unit having a positive refractive power, a second lens unit having a negative refractive power that moves for magnification-varying, a third lens unit having one of a positive refractive power and a negative refractive power that moves for magnification-varying, and a fourth lens unit having a positive refractive power, in which when an Abbe constant of a positive lens Lp having a smallest Abbe constant among lenses constituting the first lens unit is denoted by $\nu p$, a partial dispersion ratio thereof is denoted by $\theta p$, a refractive power thereof is denoted by $\phi p$, an average value of Abbe constants of positive lenses except the positive lens Lp is denoted by $\nu ap$, an average value of partial dispersion ratios of negative lenses of the first lens unit is denoted by $\theta an$, a refractive power of the first lens unit is denoted by $\phi 1$, and a refractive power of an entire zoom lens system at a telephoto end is denoted by $\phi tele$, the following conditional expressions are satisfied:

$-0.03 < (\theta p - \theta an)/\theta an < 0.15;$ $0.005 < (1/\nu p - 1/\nu ap)/(\phi 1/\phi tele) < 0.030;$ and $0.05 < \phi p/\phi 1 < 0.4.$ Further, preferably, when an average value of Abbe constants of the negative lenses among the lenses constituting the first lens unit is denoted by $\nu an$, and a sum of refractive powers of the negative lenses is denoted by $\phi n$, the following conditional expressions may be satisfied.

$0.05 < (1/\nu an - 1/\nu ap)/(\phi p/\phi 1) < 0.5$ $-1.0 < \phi n/\phi 1 < -0.4$ More preferably, the following conditional expressions may be satisfied.

$-0.5 < \phi p/\phi 1 < -0.1$ $|\nu p - \nu an| < 15$

Further, when a refractive power of the second lens unit is denoted by $\phi 2$, the following conditional expression is satisfied.

$-0.1 < \phi p/\phi 2 < -0.01$

Here, when a refractive index for g-line is denoted by Ng, a refractive index for F-line is denoted by NF, a refractive index for d-line is denoted by Nd, and a refractive index for C-line is denoted by NC, an Abbe constant $\nu$ and a partial dispersion ratio $\theta$ satisfy the following expressions, respectively.

Abbe constant $\nu = (Nd-1)/(NF-NC)$

Partial dispersion ratio $\theta = (Ng-NF)/(NF-NC)$

Further objects or other features of the present invention become apparent from the following description of exemplary embodiments and the like described with reference to the attached drawings.

According to the present invention, it is possible to provide the zoom lens system having a high magnification of zoom ratio that can appropriately correct secondary spectrum of longitudinal chromatic aberration at the telephoto end while achieving a small size and light weight.

Further features of the present invention will become apparent from the following description of exemplary embodiments with reference to the attached drawings.

DESCRIPTION OF THE EMBODIMENTS

Figure 1:
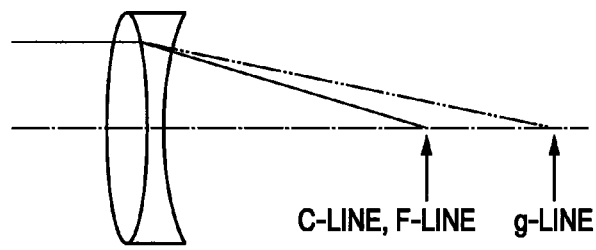
FIG. 1 is a schematic diagram illustrating dichroic achromatism and remaining secondary spectrum of a positive lens unit.

An outline of a zoom lens system according to the present invention is described below.

The zoom lens system of the present invention includes at least, in order from an object side, a first lens unit having a positive refractive power that does not move for magnification-varying, a second lens unit having a negative refractive power that moves for magnification-varying, a third lens unit having a positive or negative refractive power for correcting image plane variation due to magnification-varying, and a fourth lens unit having a positive refractive power that does not move for magnification-varying but moves for image formation.

The first lens unit includes, in order from the object side, a first sub lens unit that does not move for focusing, and a second sub lens unit having a positive refractive power that moves for focusing.

Conditional expressions in the present invention are described.

It is defined that an Abbe constant of a positive lens Lp having a smallest Abbe constant among lenses of the first lens unit is denoted by $vp$, a partial dispersion ratio thereof is denoted by $\theta p$, a refractive power thereof is denoted by $\phi p$, an average value of Abbe constants of positive lenses except the positive lens Lp is denoted by $vap$, an average value of partial dispersion ratios of negative lenses of the first lens unit is denoted by $\theta an$, a refractive power of the first lens unit is denoted by $\phi 1$, and a refractive power of the entire zoom lens system at the telephoto end is denoted by $\phi tele$. Then, it suffices that the following conditional expressions (1) to (3) be satisfied.

$$-0.03 < (\theta p - \theta an)/\theta an < 0.15 \tag{1}$$

$$0.005 < (1/vp - 1/vap)/(\phi 1/\phi tele) < 0.030 \tag{2}$$

$$0.05 < \phi p/\phi 1 < 0.4 \tag{3}$$

Preferably, when an average value of Abbe constants of negative lenses among the lenses constituting the first lens unit is denoted by $van$, and a sum of refractive powers of the negative lenses is denoted by $\phi n$, the following conditional expressions (4) and (5) may be satisfied.

$$0.05 < (1/van - 1/vap)/(\phi p/\phi 1) < 0.5 \tag{4}$$

$$-1.0 < \phi n/\phi 1 < -0.4 \tag{5}$$

More preferably, the following conditional expressions (6) and (7) may be satisfied.

$$-0.5 < \phi p/\phi 1 < -0.1 \tag{6}$$

$$|vp - van| < 15 \tag{7}$$

In addition, when a refractive power of the second lens unit is denoted by $\phi 2$, it suffices that the following conditional expression (8) be satisfied.

$$-0.1 < \phi p/\phi 2 < -0.01 \tag{8}$$

Here, when a refractive index for g-line is denoted by Ng, a refractive index for F-line is denoted by NF, a refractive index for d-line is denoted by Nd, and a refractive index for C-line is denoted by NC, an Abbe constant $v$ and a partial dispersion ratio $\theta$ satisfy the following expressions (9) and (10), respectively.

$$v = (Nd - 1)/(NF - NC) \tag{9}$$

$$\theta = (Ng - NF)/(NF - NC) \tag{10}$$

In each conditional expression, a structure of the zoom lens system, dispersion characteristic of lens material, and condition of refractive power are defined, to thereby define a condition for correcting secondary spectrum of longitudinal chromatic aberration at the telephoto end and for realizing good optical performance.

The conditional expressions (1) to (8) define the conditions for reducing a remaining secondary spectrum amount of longitudinal chromatic aberration in the first lens unit and for appropriately correcting the secondary spectrum of the longitudinal chromatic aberration at the telephoto end. An outline of the conditions is described with reference to FIGS. 1 and 2.

FIG. 1 illustrates a schematic diagram illustrating dichroic achromatism and remaining secondary spectrum of the positive lens unit.

Figure 2:
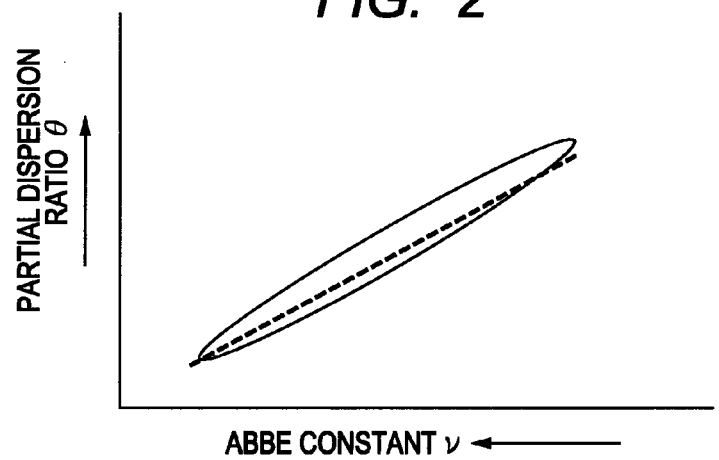
FIG. 2 is a schematic diagram of distribution of an Abbe constant $\nu$ and a partial dispersion ratio $\theta$ of optical materials.

FIG. 2 illustrates a schematic diagram of distribution of an Abbe constant $v$ and a partial dispersion ratio $\theta$ of existing optical materials.

As illustrated in FIG. 2, the existing optical material is distributed in the region having narrow partial dispersion ratio $\theta$ with respect to the Abbe constant $v$, and there is a tendency that the partial dispersion ratio $\theta$ increases as the Abbe constant $v$ decreases.

A correction condition of chromatic aberration of a thin lens system which has a predetermined refractive power $\phi$ and is constituted of two lenses 1 and 2 having refractive powers $\phi 1$ and $\phi 2$ and Abbe constants $v1$ and $v2$, respectively, is expressed by the following equation.

$$v1/v1 + \phi 2/v2 = 0 \tag{11}$$

Here, $\phi$ is expressed as follows.

$$\phi = \phi 1 + \phi 2 \tag{12}$$

If the equation (11) is satisfied, an image formation position is identical between the C-line and the F-line.

In this case, the refractive powers $\phi 1$ and $\phi 2$ are expressed by the following equations by solving the equations (11) and (12).

$$\phi 1 = \phi \times v1/(v1 - v2) \tag{13}$$

$$\phi 2 = -\phi \times v2/(v1 - v2) \tag{14}$$

In FIG. 1, as to the achromatism for the positive lens unit, a material having a large Abbe constant ν1 is used for the positive lens 1, and a material having a small Abbe constant ν2 is used for the negative lens 2. Therefore, the positive lens 1 has a small partial dispersion ratio θ1, and the negative lens 2 has a large partial dispersion ratio θ2 as illustrated in FIG. 2. Thus, if the chromatic aberration is corrected at the F-line and the C-line, the image formation point at the g-line is shifted to the image side. This deviation amount defined as a secondary spectrum amount Δ is expressed by the following equation.

$$\Delta = -(1/\phi) \times (\theta1-\theta2)/(\nu1-\nu2) \quad (15)$$

Here, it is defined that the secondary spectrum amounts of the first sub lens unit, the second sub lens unit, and the lens units after the magnification-varying system are denoted by Δ1a, Δ1b, and ΔZ, respectively. Image formation zooming factors of the second sub lens unit and the lens units after the magnification-varying system are denoted by β1b and βZ, respectively. Then, the secondary spectrum amount Δ of the entire lens system is expressed by the following equation.

$$\Delta = \Delta1a \times \beta1b^2 \times \beta Z^2 + \Delta1b \times (1-\beta1b) \times \beta Z^2 + \Delta Z \times (1-\beta Z) \quad (16)$$

The secondary spectrum amount Δ becomes significant in the first sub lens unit and the second sub lens unit in which an axial marginal light beam passes through at a high position on the telephoto side. Therefore, the secondary spectrum amount Δ of the longitudinal chromatic aberration may be reduced on the telephoto side by suppressing the sum of the secondary spectrum amounts Δ1a and Δ1b of the longitudinal chromatic aberration generated in the first sub lens unit and the second sub lens unit.

The conditional expression (1) defines a relationship of partial dispersion ratios θ of positive and negative lenses for appropriately correcting the secondary spectrum of the longitudinal chromatic aberration at the telephoto end.

If the upper limit condition of the conditional expression (1) is not satisfied, the secondary spectrum of the longitudinal chromatic aberration at the telephoto end is corrected excessively, and it becomes difficult to maintain performance balance between the longitudinal chromatic aberration and lateral chromatic aberration in the entire zoom range. In addition, if the lower limit condition of the conditional expression (1) is not satisfied, it becomes difficult to suppress the secondary spectrum of the longitudinal chromatic aberrations at the telephoto end.

The conditional expression (2) defines a relationship between the Abbe constant ν of the positive lenses and the refractive power φtele at the telephoto end, in order to satisfy both achromatism for the C-line and the F-line and the correction of the secondary spectrum at the telephoto end.

If the upper limit condition of the conditional expression (2) is not satisfied, the secondary spectrum of the longitudinal chromatic aberration at the telephoto end is corrected excessively, and it becomes difficult to maintain performance balance between the longitudinal chromatic aberration and the lateral chromatic aberration in the entire zoom range. In addition, because the refractive power φtele increases and the focal length decreases, it becomes difficult to achieve high magnification ratio. If the lower limit condition of the conditional expression (2) is not satisfied, it becomes difficult to achieve both the achromatism for the C-line and the F-line and the correction of the secondary spectrum. In addition, in order to achieve the achromatism for the C-line and the F-line, the refractive power of each lens increases, and hence it is difficult to maintain good optical performance. In another case, the number of lenses increases, and hence it becomes difficult to achieve a small size and light weight. The expression (2) is more preferred to satisfy the following conditional expression.

$$0.009 < (1/\nu p - 1/\nu ap)/(\phi1/\phi tele) < 0.025 \quad (17)$$

The conditional expression (3) defines a ratio between the refractive power φp of the positive lens Lp and the refractive power φ1 of the first lens unit, in order to achieve both the achromatism for the C-line and the F-line and the correction of the secondary spectrum at the telephoto end. If the upper limit condition of the conditional expression (3) is not satisfied, it becomes difficult to achieve the achromatism for the C-line and the F-line. In order to achieve the achromatism, the refractive power of each lens increases, and hence it becomes difficult to maintain good optical performance. In another case, the number of lenses increases, and hence it becomes difficult to achieve a small size and light weight. In addition, if the lower limit condition of the conditional expression (3) is not satisfied, the correction effect of the secondary spectrum is decreased.

The conditional expression (4) defines a relationship between the refractive power φp, and the average value of Abbe constants of the positive lenses except the positive lens Lp and the average value of Abbe constants of the negative lenses, in order to achieve both the achromatism for the C-line and the F-line and the correction of the secondary spectrum at the telephoto end. If the upper limit condition of the conditional expression (4) is not satisfied, the secondary spectrum correction effect is decreased. If the lower limit condition of the conditional expression (4) is not satisfied, the achromatism for the C-line and the F-line becomes difficult to achieve. In order to achieve the achromatism for the C-line and the F-line, the refractive power of each lens increases, and hence it becomes difficult to maintain good optical performance. In another case, the number of lenses increases, and hence it becomes difficult to achieve a small size and light weight. The conditional expression (4) is more preferred to satisfy the following conditional expression.

$$0.07 < (1/\nu an - 1/\nu ap)/(\phi p/\phi 1) < 0.50 \quad (18)$$

The conditional expression (5) defines a ratio between the sum φn of refractive powers of negative lenses of the first lens unit and the refractive power φ1, in order to realize the achromatism for the C-line and the F-line and good optical performance. If the upper limit condition of the conditional expression (5) is not satisfied, it becomes difficult to realize good optical performance. In another case, the number of lenses increases, and hence it becomes difficult to achieve a small size and light weight. In addition, if the lower limit condition of the conditional expression (5) is not satisfied, the achromatism for the C-line and the F-line becomes difficult to achieve.

The conditional expression (6) and the conditional expression (7) define a relationship among the refractive power φp, the Abbe constant νp of the positive lens Lp, the sum φn of refractive powers of negative lenses of the first lens unit, and the average value νan of Abbe constants of the negative lenses of the first lens unit, in order to achieve both the achromatism for the C-line and the F-line and the correction of the secondary spectrum, and to realize good optical performance. If the upper limit condition of the conditional expression (6) is not satisfied, the achromatism for the C-line and the F-line becomes difficult to achieve. If the lower limit condition of the conditional expression (6) is not satisfied, the secondary spectrum correction effect is decreased. In another case, the refractive power of the negative lens is increased, and hence it becomes difficult to realize good optical performance. In still another case, the number of lenses increases, and hence it becomes difficult to achieve a small size and light weight.

In the conditional expression (7), if the value of νp is larger than the value of an so that the upper limit condition is not satisfied, the secondary spectrum correction effect is decreased. In addition, if the value of νp is smaller than the value of an so that the upper limit condition is not satisfied, the achromatism for the C-line and the F-line becomes difficult to achieve. The conditional expression (7) is more preferred to satisfy the following condition.

$$|νp-νan|<8 \tag{19}$$

The conditional expression (8) defines a ratio between the refractive power φ2 of the second lens unit and the refractive power φp, in order to achieve both the high magnification ratio and the correction of the secondary spectrum.

If the upper limit condition of the conditional expression (8) is not satisfied, it becomes difficult to achieve the high magnification ratio. In addition, the focal length at the telephoto end decreases, and hence the secondary spectrum at the telephoto end can be corrected by a known method. In addition, if the lower limit condition of the conditional expression (8) is not satisfied, the refractive power of the second lens unit increases, and hence it becomes difficult to maintain good optical performance over the entire zoom range. In another case, the number of lenses increases, and hence it becomes difficult to achieve a small size and light weight.

In addition, some of the conditional expressions (1) to (8) use the average value for defining. If a lens having an extremely small refractive power like a flat glass plate is included, the range of the conditional expression may be exceeded. Therefore, it is supposed that using any number of lenses having an extremely small refractive power is included in the present invention.

[First Embodiment]

Figure 3:
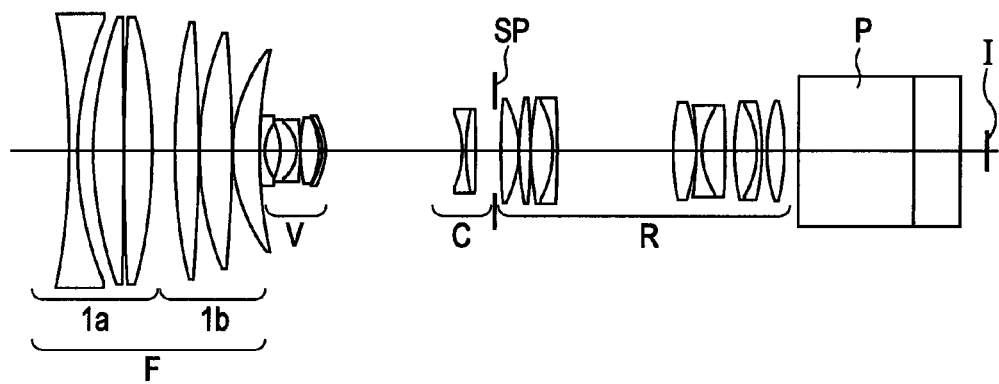
FIG. 3 is a cross sectional view at a wide angle end and in focus at infinity according to Numerical Embodiment 1.
Figure 4A:
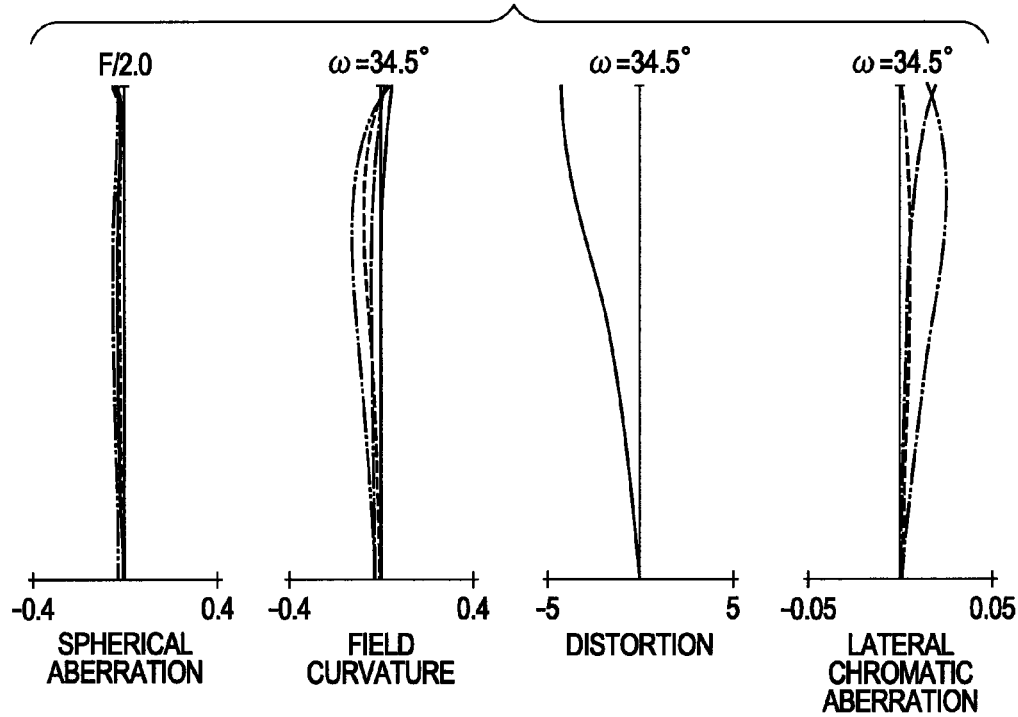
FIG. 4A is an aberration diagram at the wide angle end and in focus at 3.0 m according to Numerical Embodiment 1.
Figure 4B:
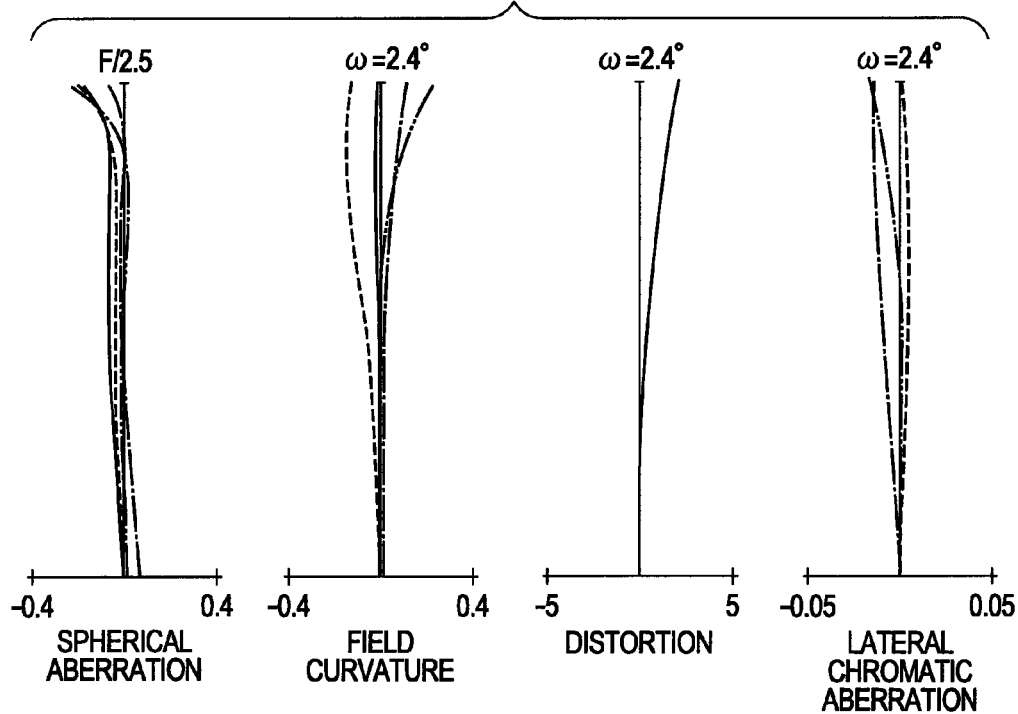
FIG. 4B is an aberration diagram at a telephoto end and in focus at 3.0 m according to Numerical Embodiment 1.

FIG. 3 is a cross sectional view of lenses at a wide angle end and in focus at an object distance of infinity according to Numerical Embodiment 1 as a first embodiment of the present invention. FIGS. 4A and 4B illustrate aberration diagrams at the wide angle end and the telephoto end, respectively, in focus at an object distance of 3 m according to Numerical Embodiment 1. In the aberration diagrams, a solid line indicates an e-line, a chain double-dashed line indicates a g-line, a dashed dotted line indicates a C-line, and a dotted line indicates an F-line. In addition, aspheric coefficients are denoted by A3 to A12. When a displacement in the optical axis direction at a position of a height H from the optical axis with reference to a surface vertex is denoted by x, the aspheric coefficients are expressed by the following expression.

$$X = \frac{(1/R)H^2}{1+\sqrt{1-(1+K)(H/R)^2}} + A3 \cdot H^3 + A4 \cdot H^4 + A5 \cdot H^5 + A6 \cdot H^6 +$$
$$A7 \cdot H^7 + A8 \cdot H^8 + A9 \cdot H^9 + A10 \cdot H^{10} + A11 \cdot H^{11} + A12 \cdot H^{12}$$

In this expression, a paraxial curvature radius is denoted by R, and a conic constant is denoted by K.

In FIG. 3, a front lens unit F has a positive refractive power as the first lens unit and does not move in the optical axis direction for magnification-varying. The first lens unit F includes a first sub lens unit that is disposed closest to the object side and does not move in the optical axis direction for focusing, and a second sub lens unit that is disposed on an image side and moves in the optical axis direction for focusing. A variator V as the second lens unit has a negative refractive power for magnification-varying and performs the magnification-varying from the wide angle end to the telephoto end by monotonously moving to the image plane side on the optical axis. A compensator C as the third lens unit has a negative refractive power and moves along the optical axis in a non-linear manner in order to correct image plane variation due to the magnification-varying. The variator V and the compensator C constitute the magnification-varying system. The zoom lens system further includes an aperture stop SP, and a relay lens unit R as the fourth lens unit, which has a positive refractive power for image formation action and does not move in the optical axis direction for the magnification-varying. The zoom lens system further includes a color separating prism or an optical filter P, which is illustrated as a glass block in FIG. 3, and an imaging plane I.

Next, the first lens unit according to this embodiment is described. The first lens unit corresponds to first to twelfth surfaces, and includes the first sub lens unit having the first to the sixth surfaces and the second sub lens unit having the seventh to the twelfth surfaces. The first sub lens unit includes, in order from the object side, a negative lens, a positive lens, and a positive lens. The second sub lens unit includes three positive lenses.

The positive lens having the smallest Abbe constant in the first lens unit is constituted of the fifth surface and the sixth surface.

Table 1 shows correspondence values of the conditional expressions in this embodiment.

This embodiment has a feature that the expressions (1), (4), (6), and (8) are close to the lower limit, the expression (3) is close to the upper limit, and an absolute value in the expression (7) is small.

This numerical embodiment satisfies all the conditional expressions, and hence achieves high magnification zoom, a small size, and light weight while appropriately correcting the longitudinal chromatic aberration at the telephoto end.

Note that in the following tables for the numerical embodiments, "e+xxx" and "e−xxx" represent "×10$^{xxx}$" and "×10$^{-xxx}$", respectively.

(Numerical Embodiment 1)
Unit mm
Surface data

TABLE 1

| Surface Number | r | D | nd | vd | θgF | Effective diameter |
|---|---|---|---|---|---|---|
| 1 | −194.100 | 2.20 | 1.84666 | 23.8 | 0.621 | 74.53 |
| 2 | 92.143 | 4.52 | | | | 71.87 |
| 3 | 104.970 | 8.46 | 1.43875 | 95.0 | 0.534 | 73.35 |
| 4 | −1944.773 | 0.50 | | | | 73.39 |
| 5 | 1583.212 | 7.77 | 1.84666 | 23.8 | 0.621 | 73.42 |
| 6 | −141.639 | 6.16 | | | | 73.40 |
| 7 | 147.739 | 6.95 | 1.43387 | 95.1 | 0.537 | 69.85 |
| 8 | −419.036 | 0.15 | | | | 69.37 |
| 9 | 87.704 | 9.18 | 1.43387 | 95.1 | 0.537 | 64.64 |
| 10 | −323.707 | 0.15 | | | | 63.68 |
| 11 | 44.477 | 7.43 | 1.43875 | 95.0 | 0.534 | 54.27 |
| 12 | 119.258 | (Variable) | | | | 53.26 |
| 13 | 380.874 | 1.00 | 2.00330 | 28.3 | 0.598 | 18.01 |
| 14 | 12.885 | 4.49 | | | | 14.88 |
| 15 | −17.048 | 4.67 | 1.92286 | 18.9 | 0.650 | 14.56 |
| 16 | −10.670 | 0.75 | 1.88300 | 40.8 | 0.567 | 15.07 |
| 17 | −1970.510 | 0.30 | | | | 16.16 |
| 18 | 48.341 | 5.22 | 1.62588 | 35.7 | 0.589 | 17.06 |
| 19 | −19.189 | 0.93 | | | | 17.80 |
| 20 | −14.733 | 0.75 | 1.88300 | 40.8 | 0.567 | 17.79 |
| 21 | −19.912 | (Variable) | | | | 18.66 |

TABLE 1-continued

| | | | | | | |
|---|---|---|---|---|---|---|
| 22 | −24.069 | 0.75 | 1.75500 | 52.3 | 0.548 | 19.00 |
| 23 | 49.851 | 2.91 | 1.84649 | 23.9 | 0.622 | 20.90 |
| 24 | −285.870 | (Variable) | | | | 21.60 |
| 25 (Stop) | 0.000 | 1.63 | | | | 24.87 |
| 26 | 171.561 | 4.79 | 1.67003 | 47.2 | 0.563 | 26.40 |
| 27 | −33.421 | 0.20 | | | | 27.10 |
| 28 | 64.284 | 3.10 | 1.48749 | 70.2 | 0.530 | 27.90 |
| 29 | −300.791 | 0.15 | | | | 27.80 |
| 30 | 70.545 | 6.14 | 1.50127 | 56.5 | 0.554 | 27.50 |
| 31 | −30.027 | 1.20 | 1.88300 | 40.8 | 0.567 | 27.10 |
| 32 | −1145.653 | 32.00 | | | | 27.10 |
| 33 | 72.712 | 6.34 | 1.49700 | 81.5 | 0.538 | 25.34 |
| 34 | −37.239 | 0.47 | | | | 24.92 |
| 35 | −72.757 | 1.40 | 1.83403 | 37.2 | 0.578 | 23.92 |
| 36 | 23.509 | 6.38 | 1.48749 | 70.2 | 0.530 | 23.05 |
| 37 | −416.047 | 2.67 | | | | 23.30 |
| 38 | 59.003 | 6.54 | 1.50127 | 56.5 | 0.554 | 24.70 |
| 39 | −25.474 | 1.40 | 1.88300 | 40.8 | 0.567 | 24.85 |
| 40 | −62.880 | 1.40 | | | | 25.78 |
| 41 | 45.276 | 4.82 | 1.50127 | 56.5 | 0.554 | 26.53 |
| 42 | −66.169 | 4.00 | | | | 26.37 |
| 43 | 0.000 | 33.00 | 1.60859 | 46.4 | 0.566 | 40.00 |
| 44 | 0.000 | 13.20 | 1.51633 | 64.2 | 0.535 | 40.00 |
| 45 | 0.000 | | | | | 40.00 |

Aspherical surface data
Thirteenth surface

K = −5.09201e+003   A4 = 4.00985e−005   A6 = −1.53470e−008
A8 = −4.42023e−009   A10 = −7.20166e−012   A12 = 5.37473e−014
A3 = −1.61689e−006   A5 = −1.92698e−006   A7 = 2.21125e−008
A9 = 4.06509e−010   A11 = −1.17225e−012

Various data
Zoom ratio 16.50

| | Wide angle | Intermediate | Telephoto |
|---|---|---|---|
| Focal length | 8.00 | 32.48 | 132.00 |
| F-number | 1.88 | 1.88 | 2.50 |
| Angle of Field | 34.51 | 9.61 | 2.39 |
| Image height | 5.50 | 5.50 | 5.50 |
| Total lens length | 257.74 | 257.74 | 257.74 |
| BF | 7.53 | 7.53 | 7.53 |
| d12 | 0.38 | 29.97 | 42.18 |
| d21 | 38.50 | 4.88 | 0.77 |
| d24 | 5.26 | 9.28 | 1.19 |
| d45 | 7.53 | 7.53 | 7.53 |
| Entrance pupil position | 44.42 | 153.01 | 441.88 |
| Exit pupil position | 150.48 | 150.48 | 150.48 |
| Front principal point position | 52.86 | 192.87 | 695.77 |
| Rear principal point position | −0.47 | −24.95 | −124.47 |

Zoom lens unit data

| Unit | First surface | Focal length | Lens structure length | Front principal point position | Rear principal point position |
|---|---|---|---|---|---|
| 1 | 1 | 56.43 | 53.48 | 31.41 | −0.57 |
| 2 | 13 | −12.86 | 18.11 | −1.00 | −16.56 |
| 3 | 22 | −37.90 | 3.66 | −0.26 | −2.27 |
| 4 | 25 | 79.32 | 130.83 | 104.19 | −181.87 |

[Second Embodiment]

Figure 5:
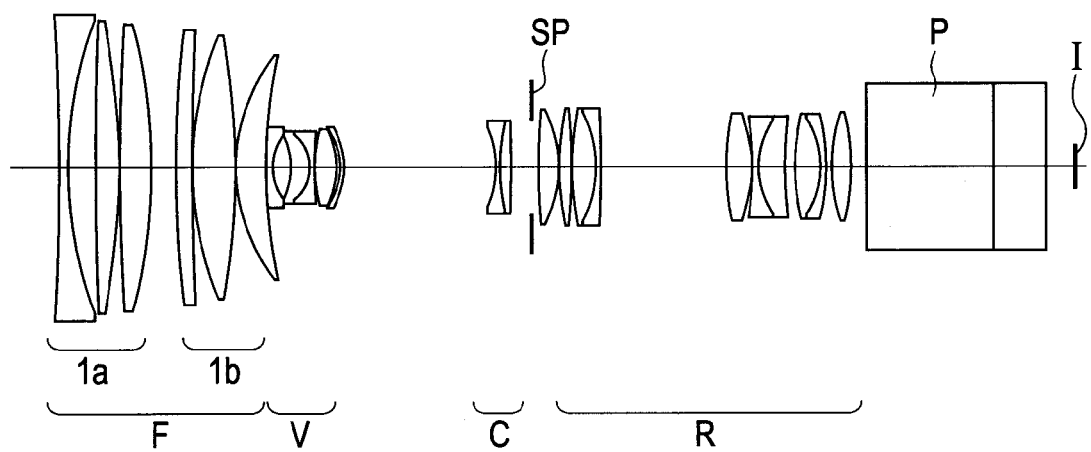
FIG. 5 is a cross sectional view at the wide angle end and in focus at infinity according to Numerical Embodiment 2.
Figure 6A:
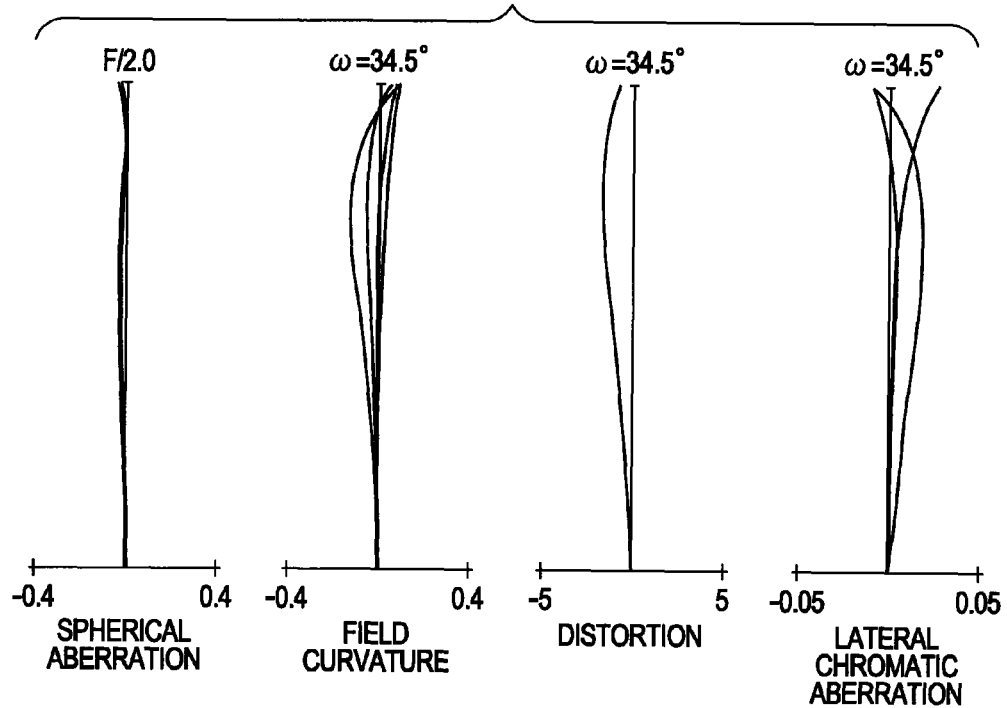
FIG. 6A is an aberration diagram at the wide angle end and in focus at 3.0 m according to Numerical Embodiment 2.
Figure 6B:
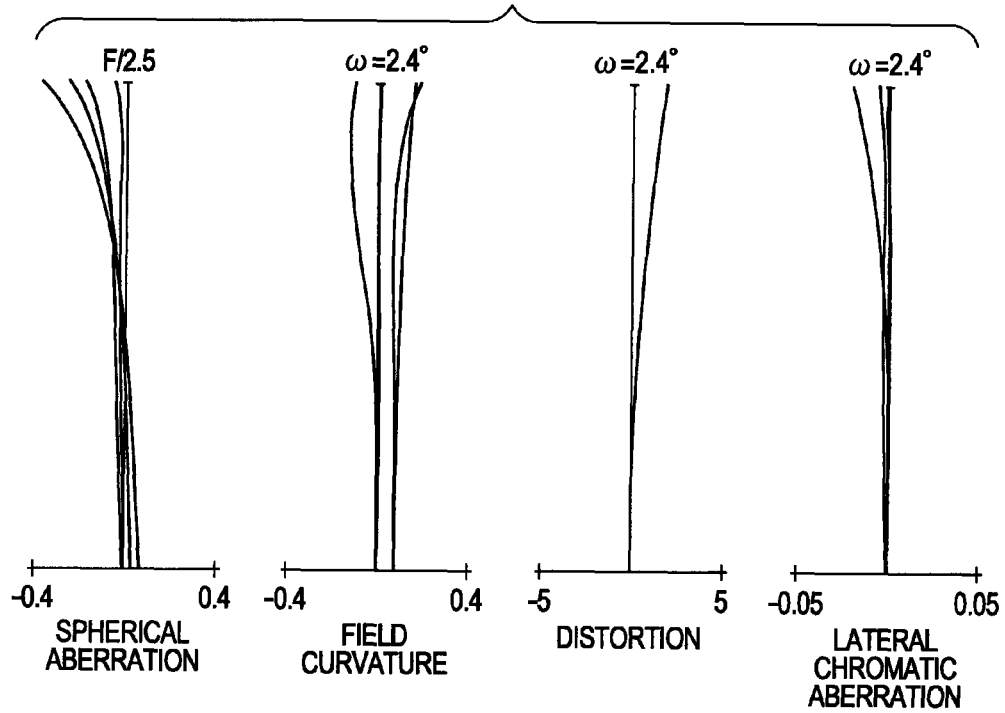
FIG. 6B is an aberration diagram at the telephoto end and in focus at 3.0 m according to Numerical Embodiment 2.

FIG. 5 is a cross sectional view of lenses at the wide angle end and in focus at an object distance of infinity according to Numerical Embodiment 2 as a second embodiment of the present invention. FIGS. 6A and 6B illustrate aberration diagrams at the wide angle end and the telephoto end, respectively, in focus at an object distance of 3 m according to Numerical Embodiment 2. In the aberration diagrams, a full line indicates an e-line, a chain double-dashed line indicates a g-line, a dashed dotted line indicates a C-line, and a dotted line indicates an F-line.

In FIG. 5, a front lens unit F has a positive refractive power as the first lens unit and does not move in the optical axis direction for magnification-varying. The first sub lens unit 1a is a partial lens system disposed closest to the object side in the first lens unit F and does not move in the optical axis direction for focusing. The second sub lens unit 1b is a positive partial lens system disposed on the image side in the first lens unit F and moves for focusing. A variator V as the second lens unit has a negative refractive power for magnification-varying and performs the magnification-varying from the wide angle end to the telephoto end by monotonously moving to the image plane side on the optical axis. A compensator C as the third lens unit has a negative refractive power and moves along the optical axis in a non-linear manner in order to correct image plane variation due to the magnification-varying. The variator V and the compensator C constitute the magnification-varying system. The zoom lens system further includes an aperture stop SP, and a relay lens unit R as the fourth lens unit, which has a positive refractive power for image formation action and does not move in the optical axis direction for the magnification-varying. The zoom lens system further includes a color separating prism or an optical filter P, which is illustrated as a glass block in FIG. 5, and an imaging plane I.

Next, the first lens unit according to this embodiment is described. The first lens unit corresponds to the first to the twelfth surfaces, and includes the first sub lens unit having the first to the sixth surfaces and the second sub lens unit having the seventh to the twelfth surfaces. The first sub lens unit includes, in order from the object side, a negative lens, a positive lens, and a positive lens. The second sub lens unit includes three positive lenses.

The positive lens having the smallest Abbe constant in the first lens unit is constituted of the seventh surface and the eighth surface.

Table 1 shows correspondence values of the conditional expressions in this embodiment.

This embodiment has a feature that the expressions (1), (2), (4), (5), (6), and (8) are close to the upper limit, and that an absolute value in the expression (7) is relatively large.

This numerical embodiment satisfies all the conditional expressions, and hence achieves high magnification zoom, a small size, and light weight while appropriately correcting the longitudinal chromatic aberration at the telephoto end.

(Numerical Embodiment 2)
Unit mm
Surface data

TABLE 2

| Surface Number | r | d | nd | vd | θgF | Effective diameter |
|---|---|---|---|---|---|---|
| 1 | −867.472 | 2.20 | 1.84666 | 23.8 | 0.603 | 74.10 |
| 2 | 100.879 | 7.11 | | | | 70.89 |
| 3 | 629.150 | 5.70 | 1.43875 | 95.0 | 0.534 | 70.91 |
| 4 | −195.176 | 0.50 | | | | 70.86 |
| 5 | 450.431 | 7.74 | 1.43387 | 95.1 | 0.537 | 69.81 |
| 6 | −158.575 | 6.42 | | | | 69.33 |
| 7 | 282.092 | 3.76 | 1.94087 | 17.4 | 0.678 | 67.32 |
| 8 | 452.483 | 0.15 | | | | 66.55 |
| 9 | 80.792 | 10.91 | 1.43387 | 95.1 | 0.537 | 64.50 |
| 10 | −186.781 | 0.15 | | | | 63.75 |
| 11 | 46.937 | 7.46 | 1.59240 | 68.3 | 0.546 | 55.16 |
| 12 | 136.421 | (Variable) | | | | 54.21 |
| 13 | 401.840 | 1.00 | 1.88300 | 40.8 | 0.567 | 18.80 |
| 14 | 12.026 | 4.81 | | | | 15.13 |
| 15 | −18.763 | 4.97 | 1.88221 | 23.8 | 0.604 | 14.71 |
| 16 | −10.338 | 0.75 | 1.88300 | 40.8 | 0.567 | 15.00 |
| 17 | 99.549 | 0.30 | | | | 16.31 |

TABLE 2-continued

| | | | | | | |
|---|---|---|---|---|---|---|
| 18 | 41.317 | 5.28 | 1.72047 | 34.7 | 0.583 | 17.17 |
| 19 | −20.294 | 0.88 | | | | 17.90 |
| 20 | −15.709 | 0.75 | 1.88300 | 40.8 | 0.567 | 17.88 |
| 21 | −22.799 | (Variable) | | | | 18.71 |
| 22 | −24.069 | 0.75 | 1.75500 | 52.3 | 0.548 | 19.00 |
| 23 | 49.851 | 2.91 | 1.84649 | 23.9 | 0.622 | 20.90 |
| 24 | −285.870 | (Variable) | | | | 21.60 |
| 25 (Stop) | 0.000 | 1.63 | | | | 24.93 |
| 26 | 308.351 | 4.85 | 1.67003 | 47.2 | 0.563 | 26.40 |
| 27 | −30.391 | 0.20 | | | | 27.10 |
| 28 | 54.847 | 3.30 | 1.48749 | 70.2 | 0.530 | 27.90 |
| 29 | −428.917 | 0.15 | | | | 27.80 |
| 30 | 122.029 | 5.93 | 1.50127 | 56.5 | 0.554 | 27.50 |
| 31 | −27.054 | 1.20 | 1.88300 | 40.8 | 0.567 | 27.10 |
| 32 | −262.878 | 31.99 | | | | 27.10 |
| 33 | 64.444 | 5.80 | 1.49700 | 81.5 | 0.538 | 26.50 |
| 34 | 41.047 | 0.47 | | | | 26.18 |
| 35 | −236.331 | 1.40 | 1.83403 | 37.2 | 0.578 | 24.83 |
| 36 | 21.345 | 7.00 | 1.48749 | 70.2 | 0.530 | 23.45 |
| 37 | 118.392 | 2.67 | | | | 23.35 |
| 38 | 50.359 | 6.56 | 1.50127 | 56.5 | 0.554 | 23.56 |
| 39 | −25.864 | 1.40 | 1.88300 | 40.8 | 0.567 | 23.27 |
| 40 | −72.216 | 1.40 | | | | 23.95 |
| 41 | 45.399 | 4.30 | 1.50127 | 56.5 | 0.554 | 24.60 |
| 42 | −66.452 | 4.00 | | | | 24.48 |
| 43 | 0.000 | 33.00 | 1.60859 | 46.4 | 0.566 | 40.00 |
| 44 | 0.000 | 13.20 | 1.51633 | 64.2 | 0.535 | 40.00 |
| 45 | 0.000 | | | | | 40.00 |

Aspherical surface data
Thirteenth surface

K = −5.09201e+003    A4 = 4.01004e−005    A6 = −1.57839e−008
A8 = −4.42907e−009   A10 = −7.28656e−012  A12 = 5.14099e−014
A3 = −1.57792e−006   A5 = −1.927506−006   A7 = 2.20666e−008
A9 = 4.050206−010    A11 = −1.18440e−012

Various data
Zoom ratio 16.50

| | Wide angle | Intermediate | Telephoto |
|---|---|---|---|
| Focal length | 8.00 | 32.48 | 132.00 |
| F-number | 1.87 | 1.87 | 2.50 |
| Angle of Field | 34.51 | 9.61 | 2.39 |
| Image height | 5.50 | 5.50 | 5.50 |
| Total lens length | 256.94 | 256.94 | 256.94 |
| BF | 7.53 | 7.53 | 7.53 |
| d12 | 0.41 | 30.00 | 42.21 |
| d21 | 38.81 | 5.19 | 1.08 |
| d24 | 5.26 | 9.28 | 1.19 |
| d45 | 7.53 | 7.53 | 7.53 |
| Entrance pupil position | 45.67 | 154.26 | 443.13 |
| Exit pupil position | 175.27 | 175.27 | 175.27 |
| Front principal point position | 54.05 | 193.03 | 679.00 |
| Rear principal point position | −0.47 | −24.95 | −124.47 |

Zoom lens unit data

| Unit | First surface | Focal length | Lens structure length | Front principal point position | Rear principal point position |
|---|---|---|---|---|---|
| 1 | 1 | 56.43 | 52.09 | 32.66 | −0.17 |
| 2 | 13 | −12.86 | 18.74 | −0.63 | −16.25 |
| 3 | 22 | −37.90 | 3.66 | −0.26 | −2.27 |
| 4 | 25 | 71.22 | 130.45 | 90.24 | −162.52 |

[Third Embodiment]

Figure 7:
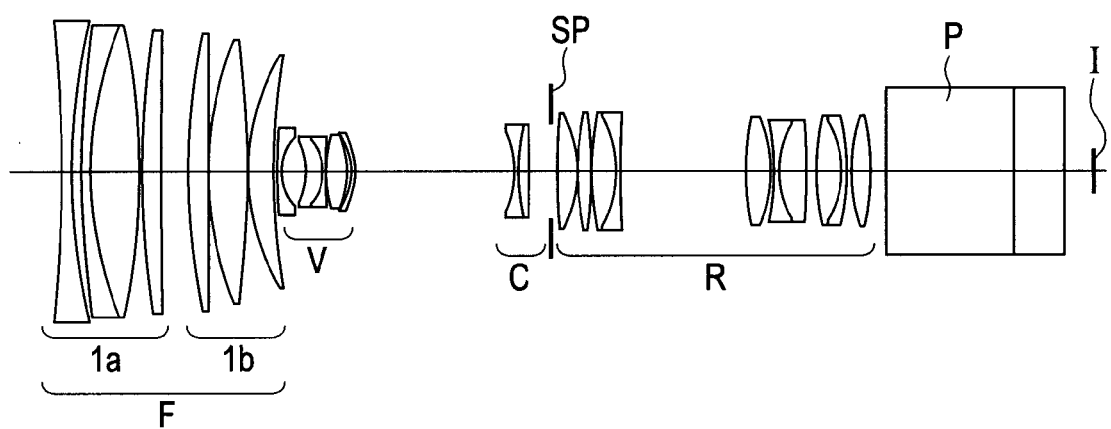
FIG. 7 is a cross sectional view at the wide angle end and in focus at infinity according to Numerical Embodiment 3.
Figure 8A:
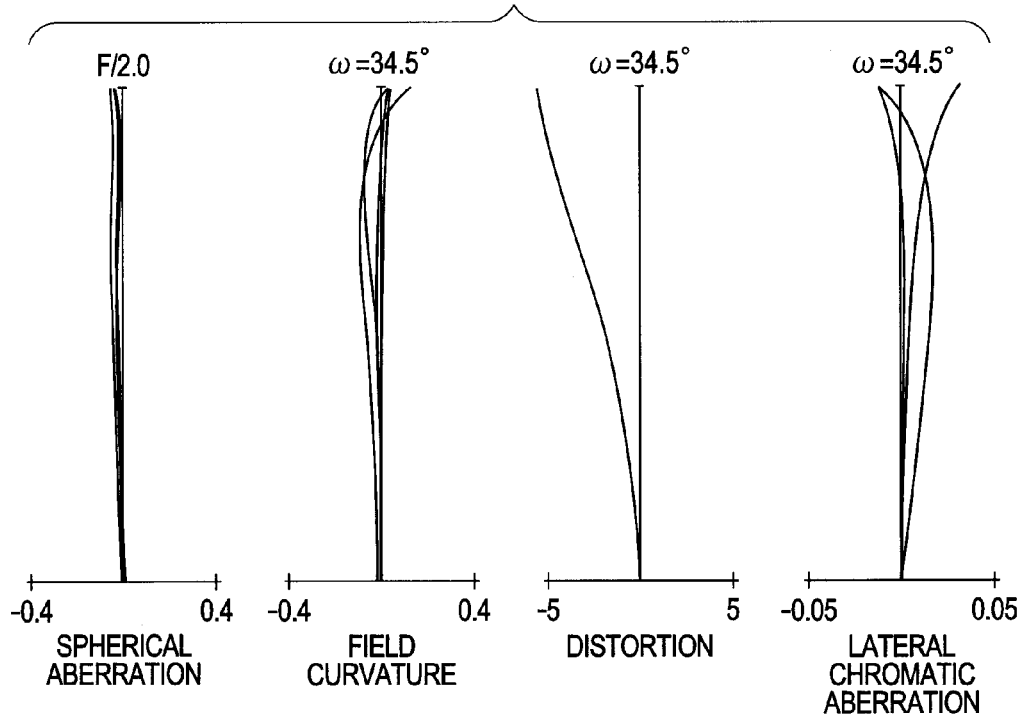
FIG. 8A is an aberration diagram at the wide angle end and in focus at 3.0 m according to Numerical Embodiment 3.
Figure 8B:
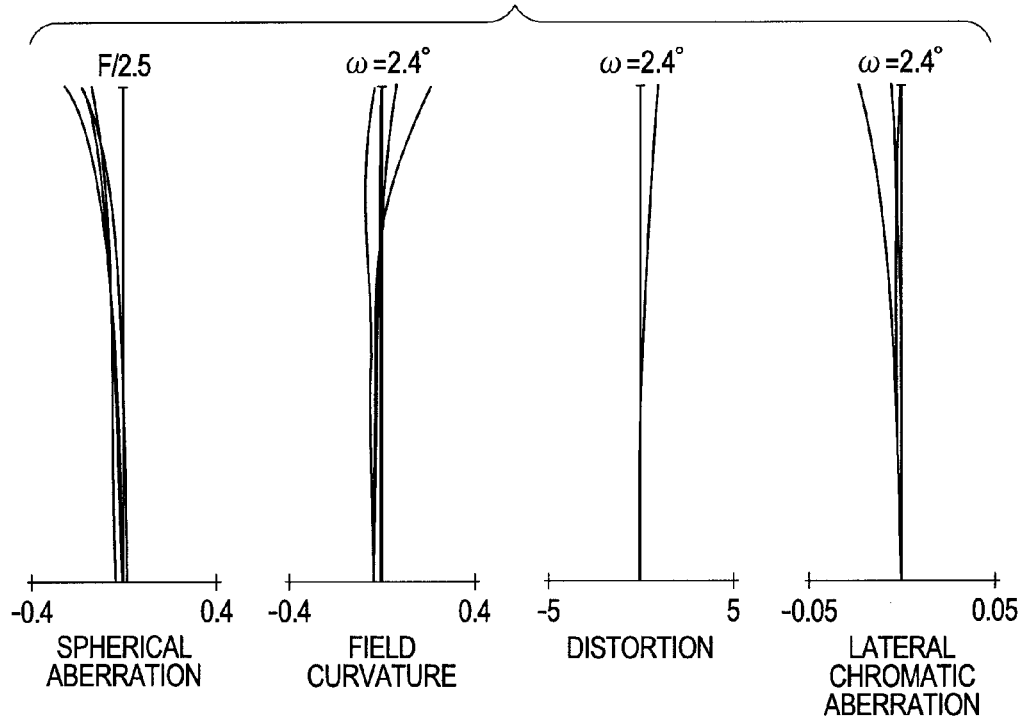
FIG. 8B is an aberration diagram at the telephoto end and in focus at 3.0 m according to Numerical Embodiment 3.

FIG. 7 is a cross sectional view of lenses at a wide angle end and in focus at an object distance of infinity according to Numerical Embodiment 3 as a third embodiment of the present invention. FIGS. 8A and 8B illustrate aberration diagrams at the wide angle end and the telephoto end, respectively, in focus at an object distance of 3 m according to Numerical Embodiment 3. In the aberration diagrams, a full line indicates an e-line, a chain double-dashed line indicates a g-line, a dashed dotted line indicates a C-line, and a dotted line indicates an F-line.

In FIG. 7, a front lens unit F has a positive refractive power as the first lens unit and does not move in the optical axis direction for magnification-varying. The first sub lens unit 1a is a partial lens system disposed closest to the object side in the first lens unit F and does not move in the optical axis direction for focusing. The second sub lens unit 1b is a positive partial lens system disposed on the image side in the first lens unit F and moves in the optical axis direction for focusing. A variator V as the second lens unit has a negative refractive power for magnification-varying and performs the magnification-varying from the wide angle end to the telephoto end by monotonously moving to the image plane side on the optical axis. A compensator C as the third lens unit has a negative refractive power and moves along the optical axis in a non-linear manner in order to correct image plane variation due to the magnification-varying. The variator V and the compensator C constitute the magnification-varying system. The zoom lens system further includes an aperture stop SP, and a relay lens unit R as the fourth lens unit, which has a positive refractive power for image formation action and does not move in the optical axis direction for the magnification-varying. The zoom lens system further includes a color separating prism or an optical filter P, which is illustrated as a glass block in FIG. 7, and an imaging plane I.

Next, the first lens unit according to this embodiment is described. The first lens unit corresponds to the first to the thirteenth surfaces, and includes the first sub lens unit having the first to the seventh surfaces and the second sub lens unit having the eighth to the thirteenth surfaces. The first sub lens unit includes, in order from the object side, a negative lens, a negative lens, a positive lens, and a positive lens. The second sub lens unit includes three positive lenses.

The positive lens having the smallest Abbe constant in the first lens unit is constituted of the sixth surface and the seventh surface.

Table 1 shows correspondence values of the conditional expressions in this embodiment.

This embodiment has a feature that the expression (5) is close to the lower limit, the expression (2) is close to the upper limit, and an absolute value in the expression (7) is relatively large.

This numerical embodiment satisfies all the conditional expressions, and hence achieves high magnification zoom, a small size, and light weight while appropriately correcting the longitudinal chromatic aberration at the telephoto end.

(Numerical Embodiment 3)
Unit mm
Surface data

TABLE 3

| Surface Number | r | d | nd | vd | θgF | Effective diameter |
|---|---|---|---|---|---|---|
| 1 | −311.357 | 2.20 | 1.84666 | 23.8 | 0.621 | 73.25 |
| 2 | 149.755 | 2.59 | | | | 70.86 |
| 3 | 229.221 | 2.20 | 1.84666 | 23.8 | 0.621 | 70.76 |
| 4 | 85.557 | 12.56 | 1.43875 | 95.0 | 0.534 | 69.44 |
| 5 | −176.215 | 0.50 | | | | 69.45 |
| 6 | 215.031 | 4.91 | 1.94087 | 17.4 | 0.678 | 68.72 |
| 7 | 1349.482 | 6.76 | | | | 68.35 |
| 8 | 153.860 | 5.20 | 1.43387 | 95.1 | 0.537 | 67.45 |
| 9 | −3649.480 | 0.15 | | | | 67.07 |
| 10 | 89.290 | 9.53 | 1.43387 | 95.1 | 0.537 | 64.32 |

TABLE 3-continued

| | | | | | | |
|---|---|---|---|---|---|---|
| 11 | −244.511 | 0.15 | | | | 63.53 |
| 12 | 56.462 | 6.18 | 1.75500 | 52.3 | 0.548 | 56.43 |
| 13 | 148.903 | (Variable) | | | | 55.53 |
| 14 | 362.476 | 1.00 | 1.88300 | 40.8 | 0.567 | 20.67 |
| 15 | 12.455 | 5.86 | | | | 16.54 |
| 16 | −23.132 | 4.67 | 1.92286 | 18.9 | 0.650 | 15.74 |
| 17 | −12.814 | 0.75 | 1.88300 | 40.8 | 0.567 | 15.97 |
| 18 | 123.434 | 0.30 | | | | 16.46 |
| 19 | 39.242 | 4.73 | 1.65412 | 39.7 | 0.574 | 17.23 |
| 20 | −26.843 | 1.20 | | | | 17.79 |
| 21 | −16.671 | 0.75 | 1.88300 | 40.8 | 0.567 | 17.79 |
| 22 | −22.506 | (Variable) | | | | 18.51 |
| 23 | −24.069 | 0.75 | 1.75500 | 52.3 | 0.548 | 19.00 |
| 24 | 49.851 | 2.91 | 1.84649 | 23.9 | 0.622 | 20.90 |
| 25 | −285.870 | (Variable) | | | | 21.60 |
| 26 (Stop) | 0.000 | 1.63 | | | | 24.92 |
| 27 | 164.927 | 4.71 | 1.67003 | 47.2 | 0.563 | 26.40 |
| 28 | −34.600 | 0.20 | | | | 27.10 |
| 29 | 59.197 | 3.63 | 1.48749 | 70.2 | 0.530 | 27.90 |
| 30 | −163.584 | 0.15 | | | | 27.80 |
| 31 | 75.454 | 5.89 | 1.50127 | 56.5 | 03554 | 27.50 |
| 32 | −31.119 | 1.20 | 1.88300 | 40.8 | 0.567 | 27.10 |
| 33 | 1000.656 | 32.00 | | | | 27.10 |
| 34 | 69.168 | 6.29 | 1.49700 | 81.5 | 0.538 | 27.10 |
| 35 | −37.293 | 0.47 | | | | 24.78 |
| 36 | −66.586 | 1.40 | 1.83403 | 37.2 | 0.578 | 23.84 |
| 37 | 24.164 | 6.83 | 1.48749 | 70.2 | 0.530 | 23.04 |
| 38 | −433.599 | 2.67 | | | | 23.89 |
| 39 | 56.136 | 6.23 | 1.50127 | 56.5 | 0.554 | 25.40 |
| 40 | −27.775 | 1.40 | 1.88300 | 40.8 | 0.567 | 25.52 |
| 41 | −63.618 | 1.40 | | | | 26.34 |
| 42 | 39.020 | 4.31 | 1.50127 | 56.5 | 0.554 | 26.96 |
| 43 | −109.144 | 4.00 | | | | 26.78 |
| 44 | 0.000 | 33.00 | 1.60859 | 46.4 | 0.566 | 40.00 |
| 45 | 0.000 | 13.20 | 1.51633 | 64.2 | 0.535 | 40.00 |
| 46 | 0.000 | | | | | 40.00 |

Aspherical surface data
Fourteenth surface

K = −5.09201e+003  A4 = 4.01061e−005  A6 = −1.55724e−008
A8 = −4.42447e−009  A10 = −7.21946e−012  A12 = 5.26878e−014
A3 = −1.42185e−006  A5 = −1.92628e−006  A7 = 2.21013e−008
A9 = 4.05526e−010  A11 = −1.17668e−012

Various data
Zoom ratio 16.50

| | Wide angle | Intermediate | Telephoto |
|---|---|---|---|
| Focal length | 8.00 | 32.48 | 132.00 |
| F-number | 1.88 | 1.88 | 2.50 |
| Angle of Field | 34.51 | 9.61 | 2.39 |
| Image height | 5.50 | 5.50 | 5.50 |
| Total lens length | 259.62 | 259.62 | 259.62 |
| BF | 7.52 | 7.52 | 7.52 |
| d13 | 0.84 | 30.43 | 42.64 |
| d22 | 39.52 | 5.91 | 1.79 |
| d25 | 5.26 | 9.28 | 1.19 |
| d46 | 7.52 | 7.52 | 7.52 |
| Entrance pupil position | 45.50 | 154.09 | 442.96 |
| Exit pupil position | 150.55 | 150.55 | 150.55 |
| Front principal point position | 53.95 | 193.95 | 696.79 |
| Rear principal point position | −0.48 | −24.96 | −124.48 |

Zoom lens unit data

| Unit | First surface | Focal length | Lens structure length | Front principal point position | Rear principal point position |
|---|---|---|---|---|---|
| 1 | 1 | 56.43 | 52.94 | 32.50 | 0.93 |
| 2 | 14 | −12.86 | 19.26 | 0.04 | −15.54 |
| 3 | 23 | −37.90 | 3.66 | −0.26 | −2.27 |
| 4 | 26 | 79.29 | 130.61 | 104.13 | −181.80 |

[Fourth Embodiment]

Figure 9:
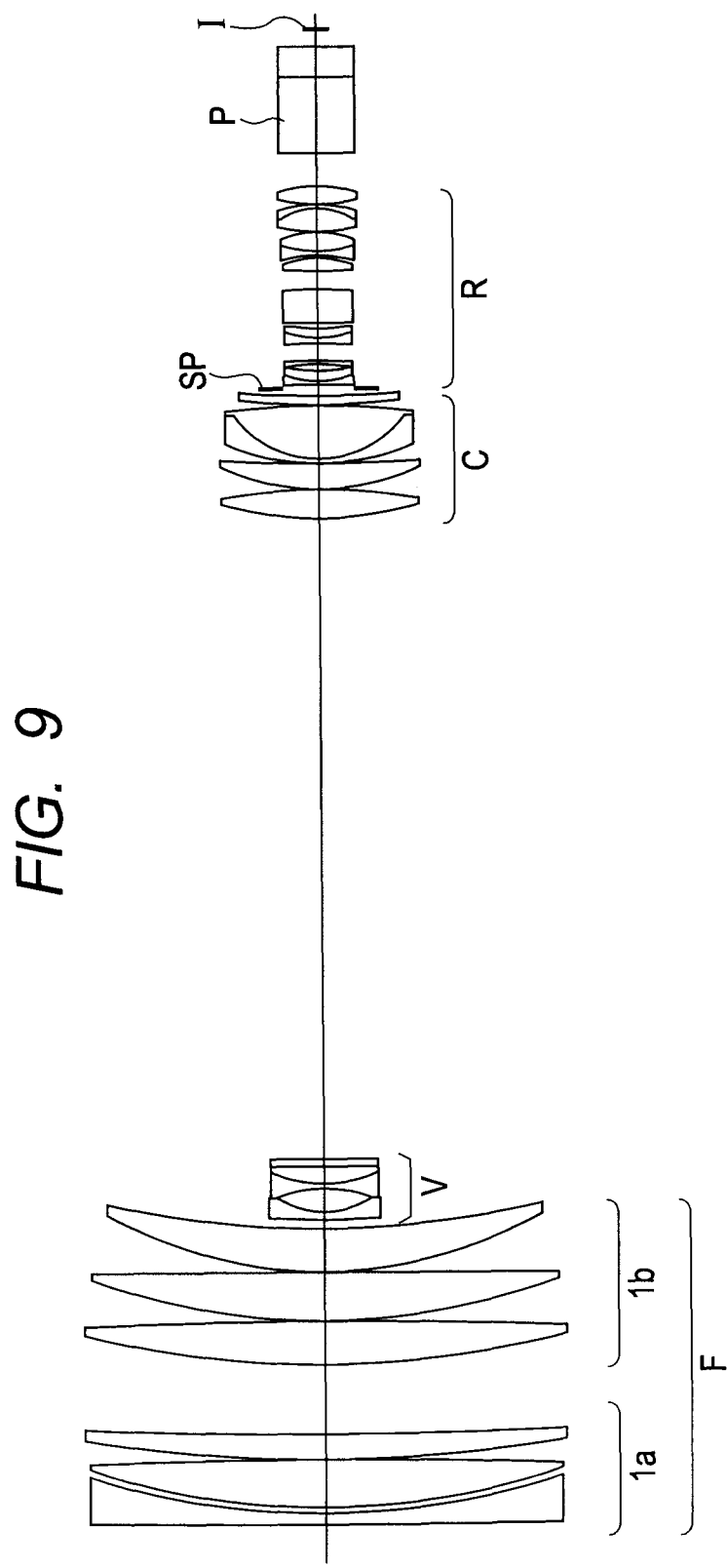
FIG. 9 is a cross sectional view at the wide angle end and in focus at infinity according to Numerical Embodiment 4.
Figure 10A:
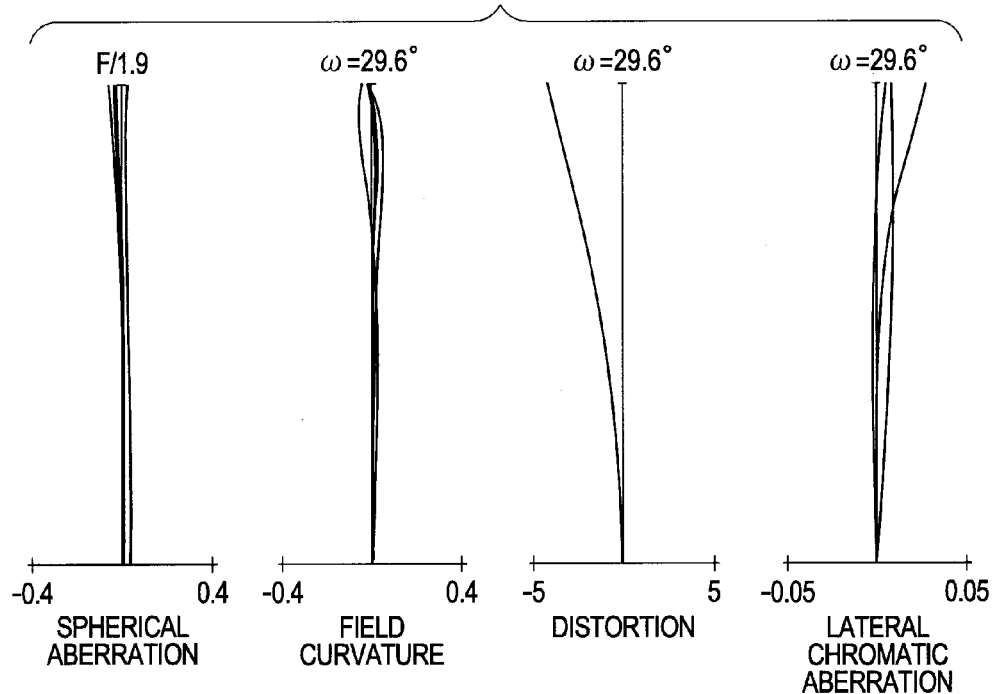
FIG. 10A is an aberration diagram at the wide angle end and in focus at 13 m according to Numerical Embodiment 4.
Figure 10B:
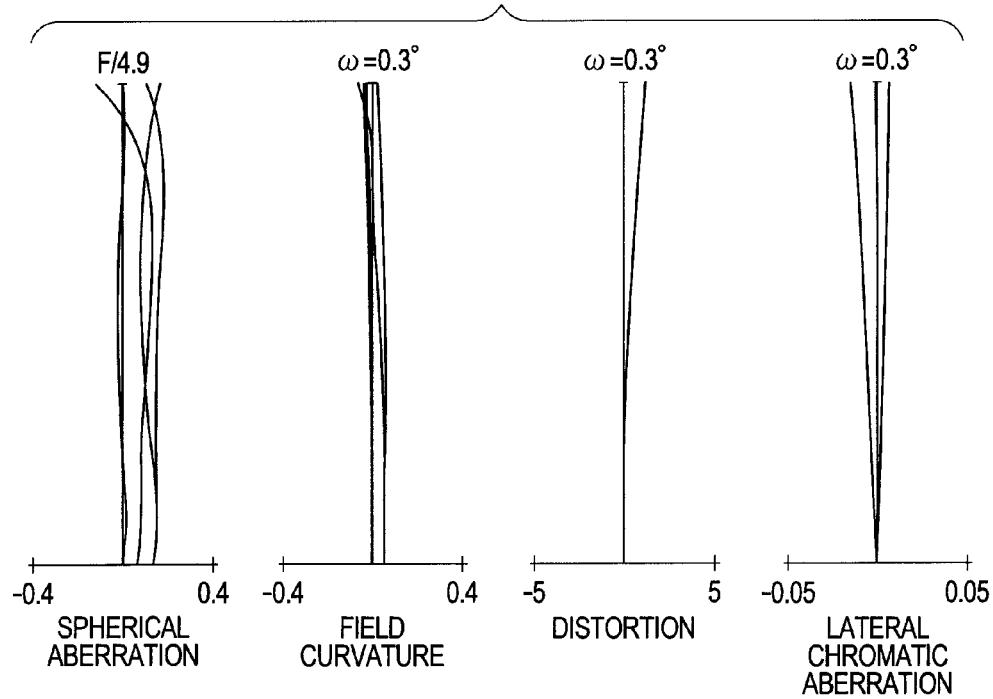
FIG. 10B is an aberration diagram at the telephoto end and in focus at 13 m according to Numerical Embodiment 4.

FIG. 9 is a cross sectional view of lenses at a wide angle end and in focus at an object distance of infinity according to Numerical Embodiment 4 as a fourth embodiment of the present invention. FIGS. 10A and 10B illustrate aberration diagrams at the wide angle end and the telephoto end, respectively, in focus at an object distance of 13 m according to Numerical Embodiment 4. In the aberration diagrams, a full line indicates an e-line, a chain double-dashed line indicates a g-line, a dashed dotted line indicates a C-line, and a dotted line indicates an F-line.

In FIG. 9, a front lens unit F has a positive refractive power as the first lens unit and does not move in the optical axis direction for magnification-varying. The first sub lens unit 1a is a partial lens system disposed closest to the object side in the first lens unit F and does not move in the optical axis direction for focusing. The second sub lens unit 1b is a positive partial lens system disposed on the image side in the first lens unit F and moves in the optical axis direction for focusing. A variator V as the second lens unit has a negative refractive power for magnification-varying and performs the magnification-varying from the wide angle end to the telephoto end by monotonously moving to the image plane side on the optical axis. A compensator C as the third lens unit has a positive refractive power and moves along the optical axis in a non-linear manner in order to correct image plane variation due to the magnification-varying. The variator V and the compensator C constitute the magnification-varying system. The zoom lens system further includes an aperture stop SP, and a relay lens unit R as the fourth lens unit, which has a positive refractive power for image formation action and does not move in the optical axis direction for the magnification-varying. The zoom lens system further includes a color separating prism or an optical filter P, which is illustrated as a glass block in FIG. 9, and an imaging plane I.

Next, the first lens unit according to this embodiment is described. The first lens unit corresponds to the first to the twelfth surfaces, and includes the first sub lens unit having the first to the sixth surfaces and the second sub lens unit having the seventh to the twelfth surfaces. The first sub lens unit includes, in order from the object side, a negative lens, a positive lens, and a positive lens. The second sub lens unit includes three positive lenses.

The positive lens having the smallest Abbe constant in the first lens unit is constituted of the fifth surface and the sixth surface.

Table 1 shows correspondence values of the conditional expressions in this embodiment.

This embodiment is has a feature that an absolute value in the expression (7) is relatively large.

This numerical embodiment satisfies all the conditional expressions, and hence achieves high magnification zoom, a small size, and light weight while appropriately correcting the longitudinal chromatic aberration at the telephoto end.

(Numerical Embodiment 4)
Unit mm
Surface data

TABLE 4

| Surface Number | r | d | nd | vd | θgF | Effective diameter |
|---|---|---|---|---|---|---|
| 1 | 4725.734 | 5.00 | 1.84666 | 23.78 | 0.621 | 196.37 |
| 2 | 324.378 | 2.60 | | | | 196.00 |
| 3 | 323.333 | 20.44 | 1.43387 | 95.1 | 0.537 | 197.60 |
| 4 | −2112.308 | 0.20 | | | | 198.02 |
| 5 | 734.527 | 10.19 | 1.94087 | 17.4 | 0.678 | 199.80 |
| 6 | 1890.502 | 29.03 | | | | 199.57 |

TABLE 4-continued

| | | | | | | |
|---|---|---|---|---|---|---|
| 7 | 409.103 | 18.04 | 1.43387 | 95.1 | 0.537 | 200.62 |
| 8 | −2472.439 | 0.20 | | | | 200.15 |
| 9 | 282.514 | 20.04 | 1.43387 | 95.1 | 0.537 | 195.65 |
| 10 | 13642.084 | 1.20 | | | | 194.54 |
| 11 | 190.949 | 17.88 | 1.45600 | 90.33 | 0.534 | 181.52 |
| 12 | 410.214 | (Variable) | | | | 178.18 |
| 13 | 495.839 | 3.34 | 1.88300 | 40.76 | 0.567 | 45.95 |
| 14 | 37.949 | 10.14 | | | | 38.90 |
| 15 | −47.944 | 1.40 | 1.75500 | 52.32 | 0.548 | 39.00 |
| 16 | 50.036 | 7.67 | 1.92286 | 18.9 | 0.650 | 43.88 |
| 17 | −2116.056 | 0.38 | | | | 44.65 |
| 18 | −761.237 | 2.16 | 1.88300 | 40.76 | 0.567 | 44.76 |
| 19 | 4430.620 | (Variable) | | | | 45.62 |
| 20 | 138.223 | 12.76 | 1.62041 | 60.29 | 0.543 | 80.65 |
| 21 | −253.485 | 0.20 | | | | 81.18 |
| 22 | 90.526 | 11.19 | 1.62041 | 60.29 | 0.543 | 82.02 |
| 23 | 580.574 | 0.20 | | | | 81.07 |
| 24 | 100.649 | 2.30 | 1.76182 | 26.52 | 0.614 | 77.95 |
| 25 | 44.960 | 22.90 | 1.45600 | 90.33 | 0.534 | 70.68 |
| 26 | −296.393 | 0.20 | | | | 69.57 |
| 27 | 198.352 | 3.99 | 1.62041 | 60.29 | 0.543 | 66.90 |
| 28 | 280.602 | (Variable) | | | | 65.36 |
| 29 (Stop) | 0.000 | 2.12 | | | | 30.56 |
| 30 | −203.113 | 1.40 | 1.81600 | 46.62 | 0.557 | 29.62 |
| 31 | 42.004 | 0.20 | | | | 28.52 |
| 32 | 35.010 | 4.09 | 1.84666 | 23.78 | 0.621 | 28.63 |
| 33 | 83.312 | 2.97 | | | | 27.90 |
| 34 | −68.919 | 1.40 | 1.88300 | 40.76 | 0.567 | 27.77 |
| 35 | −114.243 | 7.96 | | | | 27.83 |
| 36 | −98.967 | 1.80 | 1.75500 | 52.32 | 0.548 | 26.47 |
| 37 | 38.793 | 4.40 | 1.80515 | 25.5 | 0.616 | 26.58 |
| 38 | 195.671 | 2.33 | | | | 26.57 |
| 39 | −461.129 | 14.17 | 1.60311 | 60.64 | 0.541 | 26.75 |
| 40 | −150.247 | 7.75 | | | | 27.97 |
| 41 | −529.595 | 5.80 | 1.48749 | 70.23 | 0.530 | 28.21 |
| 42 | −35.141 | 1.08 | | | | 28.32 |
| 43 | −40.105 | 1.60 | 1.88300 | 40.76 | 0.567 | 27.68 |
| 44 | 64.179 | 8.30 | 1.48749 | 70.23 | 0.530 | 28.50 |
| 45 | −37.278 | 0.19 | | | | 29.63 |
| 46 | 93.189 | 9.55 | 1.48749 | 70.23 | 0.530 | 29.86 |
| 47 | −30.530 | 1.60 | 1.88300 | 40.76 | 0.567 | 30.04 |
| 48 | −67.705 | 0.15 | | | | 31.09 |

Aspherical surface data

Thirteenth surface

K = −3.78345e+002    A4 = 1.00185e−006    A6 = 5.92298e−009
A8 = −1.07010e−010   A10 = −4.83189e−013  A12 = −1.13291e−016
A3 = −7.31081e−007   A5 = −7.24884e−008   A7 = 2.42636e−010
A9 = 1.02311e−011    A11 = 1.16099e−014

Twenty-first surfaces

K = −1.14405e+001    A4 = −4.12140e−008   A6 = −5.50294e−011
A8 = 4.13936e−013    A10 = −2.42495e−016  A12 = −2.69997e−020
A3 = 3.47432e−007    A5 = 1.56395e−009    A7 = −6.31482e−012
A9 = −2.45242e−015   A11 = 5.08235e−018

Twenty-seventh surfaces

K = −1.23649e+001    A4 = −1.53197e−007   A6 = −2.07023e−010
A8 = −6.20327e−014   A10 = 2.00618e−015   A12 = 6.46068e−019
A3 = 6.470446−007    A5 = 4.24165e−010    A7 = 9.58159e−012
A9 = −2.42361e−014   A11 = −6.09256e−017

Various data
Zoom ratio 99.20

| | Wide angle | Intermediate | Telephoto |
|---|---|---|---|
| Focal length | 9.70 | 70.06 | 962.21 |
| F-number | 1.87 | 1.87 | 4.90 |
| Angle of Field | 29.55 | 4.49 | 0.33 |
| Image height | 5.50 | 5.50 | 5.50 |
| Total lens length | 637.61 | 637.61 | 637.61 |
| BF | 8.01 | 8.01 | 8.01 |
| d12 | 3.55 | 133.55 | 181.41 |
| d19 | 272.31 | 120.13 | 1.90 |
| d28 | 3.00 | 25.18 | 95.54 |
| d53 | 8.01 | 8.01 | 8.01 |
| Entrance pupil position | 142.45 | 824.48 | 12587.94 |
| Exit pupil position | 216.36 | 216.36 | 216.36 |
| Front principal point position | 152.60 | 918.10 | 17993.92 |
| Rear principal point position | −1.69 | −62.05 | −954.20 |

Zoom lens unit data

| Unit | First surface | Focal length | Lens structure length | Front principal point position | Rear principal point position |
|---|---|---|---|---|---|
| 1 | 1 | 249.09 | 124.82 | 68.21 | −23.49 |
| 2 | 13 | −26.53 | 25.10 | 5.50 | −11.90 |
| 3 | 20 | 66.65 | 53.75 | 8.86 | −27.35 |
| 4 | 29 | 44.40 | 147.08 | 56.67 | 11.30 |

[Fifth Embodiment]

Figure 11:
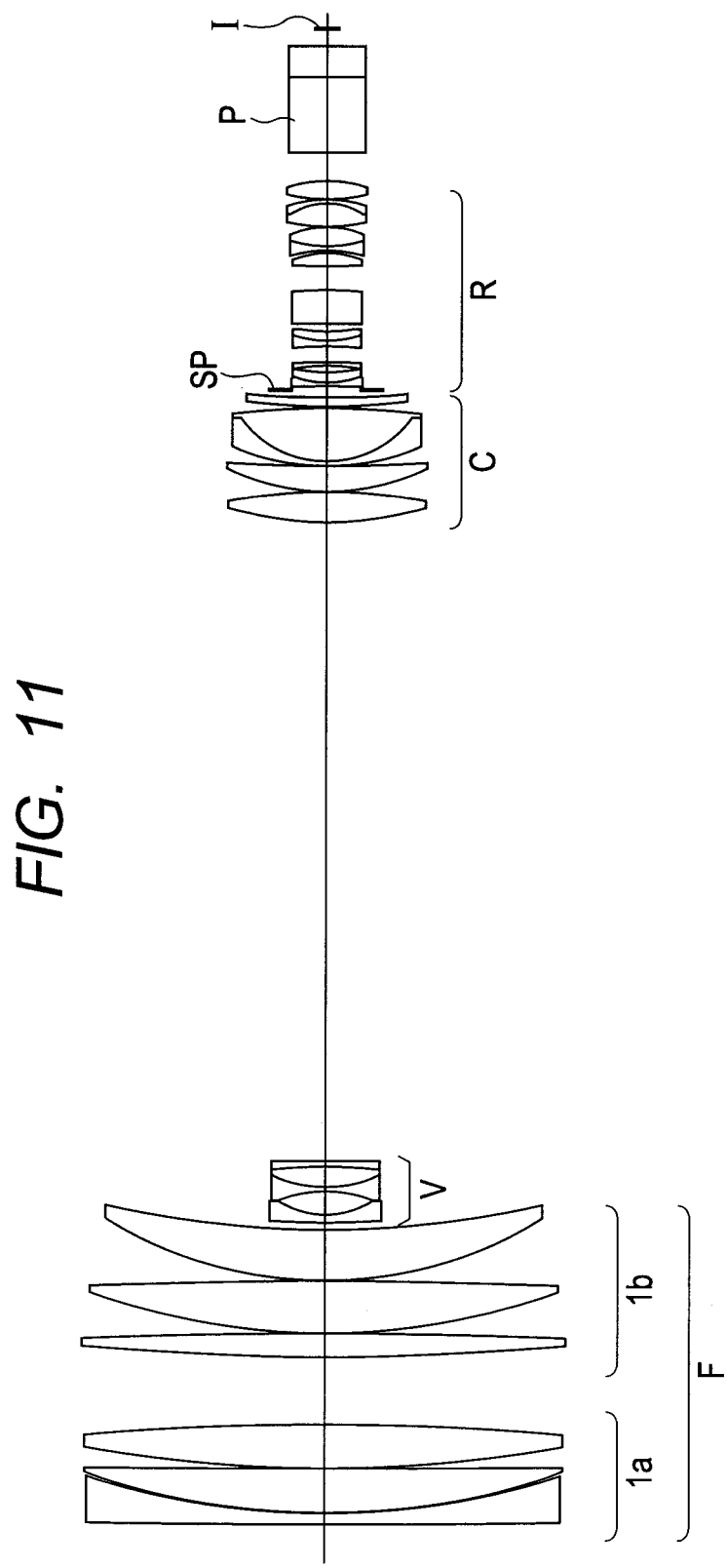
FIG. 11 is a cross sectional view at the wide angle end and in focus at infinity according to Numerical Embodiment 5.
Figure 12A:
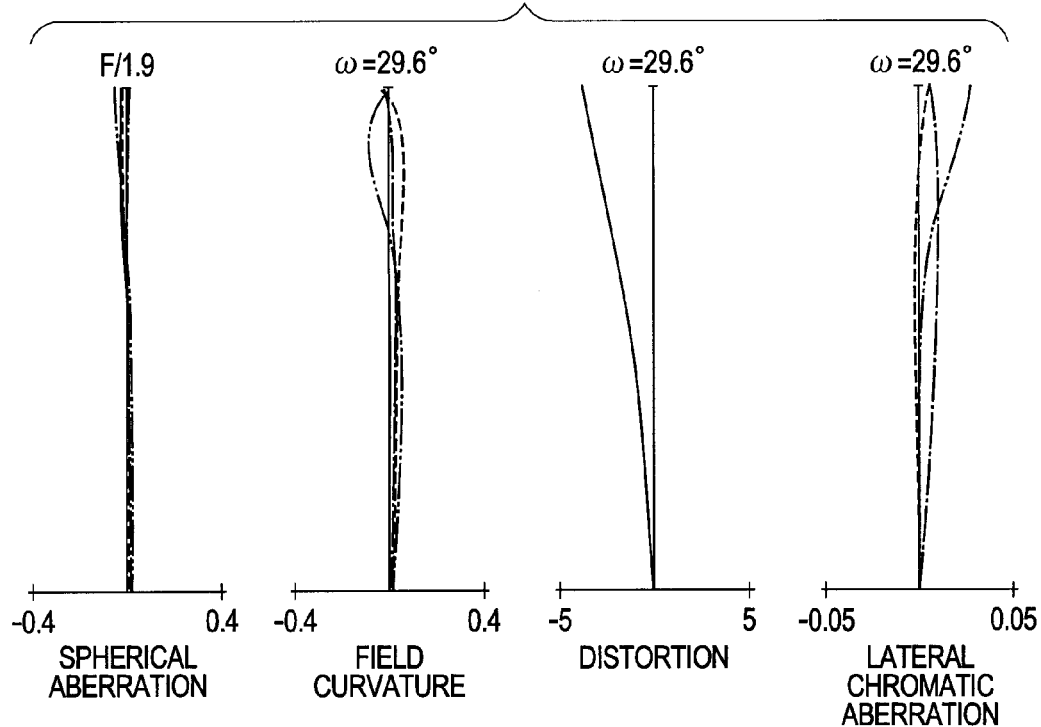
FIG. 12A is an aberration diagram at the wide angle end and in focus at 13 m according to Numerical Embodiment 5.
Figure 12B:
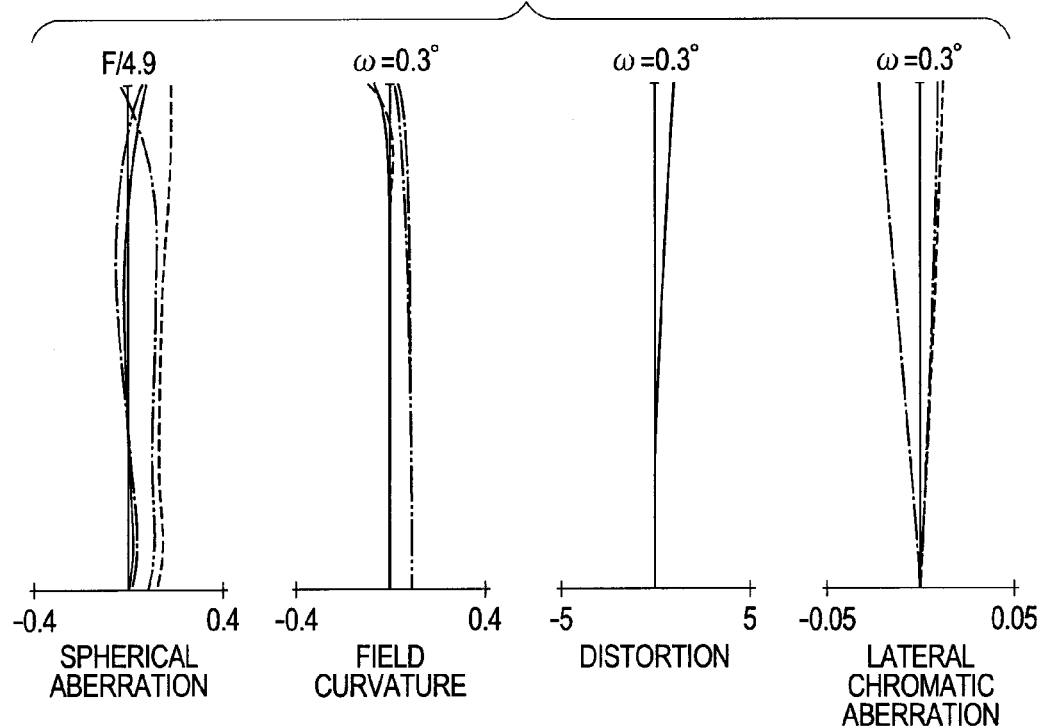
FIG. 12B is an aberration diagram at the telephoto end and in focus at 13 m according to Numerical Embodiment 5.

FIG. 11 is a cross sectional view of lenses at the wide angle end and in focus at an object distance of infinity according to Numerical Embodiment 5 as a fifth embodiment of the present invention. FIGS. 12A and 12B illustrate aberration diagrams at the wide angle end and the telephoto end, respectively, in focus at an object distance of 13 m according to Numerical Embodiment 5. In the aberration diagrams, a full line indicates an e-line, a chain double-dashed line indicates a g-line, a dashed dotted line indicates a C-line, and a dotted line indicates an F-line.

In FIG. 11, a front lens unit F has a positive refractive power as the first lens unit and does not move in the optical axis direction for magnification-varying. The first sub lens unit 1a is a partial lens system disposed closest to the object side in the first lens unit F and does not move in the optical axis direction for focusing. The second sub lens unit 1b is a positive partial lens system disposed on the image side in the first lens unit F and moves in the optical axis direction for focusing. A variator V as the second lens unit has a negative refractive power for magnification-varying and performs the magnification-varying from the wide angle end to the telephoto end by monotonously moving to the image plane side on the optical axis. A compensator C as the third lens unit has a positive refractive power and moves along the optical axis in a non-linear manner in order to correct image plane variation due to the magnification-varying. The variator V and the compensator C constitute the magnification-varying system. The zoom lens system further includes an aperture stop SP, and a relay lens unit R as the fourth lens unit, which has a positive refractive power for image formation action and does not move in the optical axis direction for the magnification-varying. The zoom lens system further includes a color separating prism or an optical filter P, which is illustrated as a glass block in FIG. 11, and an imaging plane I.

Next, the first lens unit according to this embodiment is described. The first lens unit corresponds to the first to the twelfth surfaces, and includes the first sub lens unit having the first to the sixth surfaces and the second lens unit having the seventh to the twelfth surfaces. The first sub lens unit includes, in order from the object side, a negative lens, a positive lens, and a positive lens. The second sub lens unit includes three positive lenses.

The positive lens having the smallest Abbe constant in the first lens unit is constituted of the seventh surface and the eighth surface.

Table 1 shows correspondence values of the conditional expressions in this embodiment.

This embodiment has a feature that the expression (2) is close to the lower limit.

This numerical embodiment satisfies all the conditional expressions, and hence achieves high magnification zoom, a small size, and light weight while appropriately correcting the longitudinal chromatic aberration at the telephoto end.

(Numerical Embodiment 5)
Unit mm
Surface data

TABLE 5

| Surface Number | r | D | nd | vd | θgF | Effective diameter |
|---|---|---|---|---|---|---|
| 1 | 5069.860 | 5.00 | 1.84666 | 23.8 | 0.621 | 196.37 |
| 2 | 325.039 | 1.04 | | | | 196.03 |
| 3 | 323.625 | 18.17 | 1.43387 | 95.1 | 0.537 | 196.70 |
| 4 | −20136.695 | 0.20 | | | | 197.13 |
| 5 | 549.795 | 17.84 | 1.43387 | 95.1 | 0.537 | 199.32 |
| 6 | −1834.743 | 29.25 | | | | 199.60 |
| 7 | 908.328 | 8.94 | 1.89000 | 19.2 | 0.662 | 200.31 |
| 8 | 26618.242 | 0.20 | | | | 199.96 |
| 9 | 272.533 | 21.92 | 1.43387 | 95.1 | 0.537 | 196.76 |
| 10 | −6500.318 | 1.20 | | | | 195.77 |
| 11 | 181.670 | 21.07 | 1.43875 | 95.0 | 0.534 | 181.87 |
| 12 | 410.887 | (Variable) | | | | 177.37 |
| 13 | 461.347 | 3.34 | 2.00330 | 28.3 | 0.598 | 45.20 |
| 14 | 40.835 | 9.35 | | | | 38.93 |
| 15 | −52.153 | 1.40 | 1.75500 | 52.3 | 0.548 | 39.04 |
| 16 | 48.774 | 8.82 | 1.92286 | 18.9 | 0.650 | 43.69 |
| 17 | −164.616 | 0.33 | | | | 44.33 |
| 18 | −138.701 | 2.16 | 1.88300 | 40.8 | 0.567 | 44.34 |
| 19 | 1238.715 | (Variable) | | | | 45.69 |
| 20 | 138.192 | 13.17 | 1.62041 | 60.3 | 0.543 | 80.61 |
| 21 | −252.800 | 0.20 | | | | 81.18 |
| 22 | 89.967 | 11.02 | 1.62041 | 60.3 | 0.543 | 81.92 |
| 23 | 513.793 | 0.20 | | | | 80.95 |
| 24 | 96.398 | 2.30 | 1.76182 | 26.5 | 0.614 | 77.76 |
| 25 | 44.323 | 22.87 | 1.45600 | 90.3 | 0.534 | 70.37 |
| 26 | −370.054 | 0.20 | | | | 69.16 |
| 27 | 191.012 | 3.77 | 1.62041 | 60.3 | 0.543 | 66.71 |
| 28 | 280.823 | (Variable) | | | | 65.31 |
| 29 (Stop) | 0.000 | 1.76 | | | | 30.58 |
| 30 | −187.087 | 1.40 | 1.81600 | 46.6 | 0.557 | 29.89 |
| 31 | 41.687 | 0.20 | | | | 28.79 |
| 32 | 34.858 | 3.85 | 1.84666 | 23.8 | 0.621 | 28.92 |
| 33 | 85.072 | 2.97 | | | | 28.30 |
| 34 | −73.508 | 1.40 | 1.88300 | 40.8 | 0.567 | 28.17 |
| 35 | −109.354 | 7.50 | | | | 28.20 |
| 36 | −100.422 | 1.80 | 1.75500 | 52.3 | 0.548 | 26.73 |
| 37 | 38.657 | 4.57 | 1.80515 | 25.5 | 0.616 | 26.76 |
| 38 | 217.099 | 3.46 | | | | 26.72 |
| 39 | −399.945 | 15.22 | 1.60311 | 60.6 | 0.541 | 26.92 |
| 40 | −196.132 | 9.53 | | | | 27.96 |
| 41 | −323.604 | 5.96 | 1.48749 | 70.2 | 0.530 | 28.21 |
| 42 | −35.395 | 1.08 | | | | 28.36 |
| 43 | −41.677 | 1.60 | 1.88300 | 40.8 | 0.567 | 27.72 |
| 44 | 54.289 | 7.91 | 1.48749 | 70.2 | 0.530 | 28.53 |
| 45 | −36.537 | 0.19 | | | | 29.49 |
| 46 | 63.012 | 9.36 | 1.48749 | 70.2 | 0.530 | 30.07 |
| 47 | −30.460 | 1.60 | 1.88300 | 40.8 | 0.567 | 30.14 |
| 48 | −81.116 | 0.15 | | | | 31.16 |

Aspherical surface data

Thirteenth surface

K = −2.86360e+002   A4 = 8.09315e−007   A6 = 6.66192e−009
A8 = −1.07787e−010   A10 = −4.82801e−013   A12 = −1.14295e−016
A3 = −7.81633e−007   A5 = −7.85780e−008   A7 = 2.27202e−010
A9 = 1.02677e−011   A11 = 1.16076e−014

TABLE 5-continued

Twenty-first surfaces

K = −9.70854e+000   A4 = −3.22022e−008   A6 = −6.22721e−011
A8 = 4.19895e−013   A10 = −2.5031e−016   A12 = −2.67289e−020
A3 = 2.95358e−007   A5 = 7.05297e−010   A7 = −5.82704e−012
A9 = −2.39260e−015   A11 = 5.10953e−018

Twenty-seventh surfaces

K = −1.37826e+001   A4 = −8.24180e−008   A6 = −2.07164e−010
A8 = 6.02187e−014   A10 = 1.94385e−015   A12 = 6.46986e−019
A3 = 6.02837e−007   A5 = −1.15214e−009   A7 = 7.90811e−012
A9 = −2.42701e−014   A11 = −6.06147e−017

Various data
Zoom ratio 99.20

| | Wide angle | Intermediate | Telephoto |
|---|---|---|---|
| Focal length | 9.70 | 70.06 | 962.21 |
| F-number | 1.87 | 1.87 | 4.90 |
| Angle of Field | 29.55 | 4.49 | 0.33 |
| Image height | 5.50 | 5.50 | 5.50 |
| Total lens length | 639.60 | 639.60 | 639.60 |
| BF | 7.98 | 7.98 | 7.98 |
| d12 | 2.95 | 132.95 | 180.81 |
| d19 | 272.29 | 120.12 | 1.89 |
| d28 | 3.00 | 25.18 | 95.54 |
| d53 | 7.98 | 7.98 | 7.98 |
| Entrance pupil position | 141.49 | 823.49 | 12581.27 |
| Exit pupil position | 188.72 | 188.72 | 188.72 |
| Front principal point position | 151.71 | 920.71 | 18666.05 |
| Rear principal point position | −1.72 | −62.08 | −954.23 |

Zoom lens unit data

| Unit | First surface | Focal length | Lens structure length | Front principal point position | Rear principal point position |
|---|---|---|---|---|---|
| 1 | 1 | 249.09 | 124.84 | 67.25 | −24.52 |
| 2 | 13 | −26.53 | 25.40 | 5.08 | −11.99 |
| 3 | 20 | 66.65 | 53.73 | 8.79 | −27.33 |
| 4 | 29 | 42.91 | 149.41 | 56.58 | 11.16 |

An image pickup apparatus is constituted of the zoom lens system according to any one of the above-mentioned embodiments, and a camera that is coupled to the zoom lens system for photographing a subject whose image is formed by the zoom lens system. Thus, it is possible to realize the image pickup apparatus that can appropriately correct the secondary spectrum of the longitudinal chromatic aberration on the telephoto side and can realize a small size and light weight.

The exemplary embodiments of the present invention are described above, but needless to say, the present invention is not limited to those embodiments, and various modifications and changes can be made thereto without departing from the spirit of the present invention.

TABLE 6

Table 1 correspondence values of conditional
expressions in Numerical Embodiments 1 to 5

| Number of conditional expression | Numerical Embodiment 1 | Numerical Embodiment 2 | Numerical Embodiment 3 | Numerical Embodiment 4 | Numerical Embodiment 5 |
|---|---|---|---|---|---|
| (1) | 0.000 | 0.123 | 0.092 | 0.092 | 0.067 |
| (2) | 0.013 | 0.020 | 0.020 | 0.012 | 0.011 |

TABLE 6-continued

Table 1 correspondence values of conditional expressions in Numerical Embodiments 1 to 5

| Number of conditional expression | Numerical Embodiment 1 | Numerical Embodiment 2 | Numerical Embodiment 3 | Numerical Embodiment 4 | Numerical Embodiment 5 |
|---|---|---|---|---|---|
| (3) | 0.370 | 0.073 | 0.211 | 0.199 | 0.067 |
| (4) | 0.085 | 0.423 | 0.143 | 0.158 | 0.132 |
| (5) | −0.775 | −0.534 | −0.829 | −0.611 | −0.613 |
| (6) | −0.478 | −0.136 | −0.254 | −0.325 | −0.389 |
| (7) | 0.000 | 6.380 | 6.380 | 6.380 | 4.630 |
| (8) | −0.084 | −0.017 | −0.048 | −0.021 | −0.025 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-260974, filed Nov. 24, 2010, which is hereby incorporated by reference herein in its entirety.

What is claimed is:

1. A zoom lens system, comprising, in order from an object side:
a first lens unit having a positive refractive power;
a second lens unit having a negative refractive power that moves for magnification-varying;
a third lens unit having one of a positive refractive power and a negative refractive power that moves for magnification-varying; and
a fourth lens unit having a positive refractive power, wherein:
when an Abbe constant of a positive lens Lp having a smallest Abbe constant among lenses constituting the first lens unit is denoted by $\nu p$, a partial dispersion ratio thereof is denoted by $\theta p$, a refractive power thereof is denoted by $\phi p$, an average value of Abbe constants of positive lenses except the positive lens Lp is denoted by $\nu ap$, an average value of partial dispersion ratios of negative lenses of the first lens unit is denoted by $\theta an$, a refractive power of the first lens unit is denoted by $\phi 1$, and a refractive power of an entire zoom lens system at a telephoto end is denoted by $\phi tele$, the following expressions are satisfied:

$-0.03 < (\theta p - \theta an)/\theta an < 0.15;$ $0.005 < (1/\nu p - 1/\nu ap)/(\phi 1/\phi tele) < 0.030;$ and $0.05 < \phi p/\phi 1 < 0.4,$ provided that, when a refractive index for g-line is denoted by Ng, a refractive index for C-line is denoted by NC, a refractive index for d-line is denoted by Nd, and a refractive index for F-line is denoted by NF, the following expressions are satisfied;

Abbe constant $\nu = (Nd-1)/(NF-NC)$

Partial dispersion ratio $\theta = (Ng-NF)/(NF-NC)$.

2. A zoom lens system according to claim 1, wherein when an average value of Abbe constants of the negative lenses among the lenses constituting the first lens unit is denoted by $\nu an$, and a sum of refractive powers of the negative lenses is denoted by $\phi n$, the following conditional expressions are satisfied;

$0.05 < (1/\nu an - 1/\nu ap)/(\phi p/\phi 1) < 0.5$ $-1.0 < \phi n/\phi 1 < -0.4.$ 3. A zoom lens system according to claim 1, wherein the following conditional expressions are satisfied;

$-0.5 < \phi p/\phi 1 < -0.1$ $|\nu p - \nu an| < 15.$

4. A zoom lens system according to claim 1, wherein when a refractive power of the second lens unit is denoted by $\phi 2$, the following conditional expression is satisfied;

$-0.1 < \phi p/\phi 2 < -0.01.$

5. A zoom lens system according to claim 1, wherein:
the first lens unit includes, in order from the object side, a first sub lens unit that does not move for focusing and a second sub lens unit having a positive refractive power that moves for focusing; and
the positive lens Lp is included in the first sub lens unit.

6. An image pickup apparatus comprising:
a camera body; and
a zoom lens system coupled to the camera body, wherein the zoom lens system includes, in order from an object side:
a first lens unit having a positive refractive power;
a second lens unit having a negative refractive power that moves for magnification-varying;
a third lens unit having one of a positive refractive power and a negative refractive power that moves for magnification-varying; and
a fourth lens unit having a positive refractive power, wherein:
when an Abbe constant of a positive lens Lp having a smallest Abbe constant among lenses constituting the first lens unit is denoted by $\nu p$, a partial dispersion ratio thereof is denoted by $\theta p$, a refractive power thereof is denoted by $\phi p$, an average value of Abbe constants of positive lenses except the positive lens Lp is denoted by $\nu ap$, an average value of partial dispersion ratios of negative lenses of the first lens unit is denoted by $\theta an$, a refractive power of the first lens unit is denoted by $\phi 1$, and a refractive power of an entire zoom lens system at a telephoto end is denoted by $\phi tele$, the following expressions are satisfied:

$-0.03 < (\theta p - \theta an)/\theta an < 0.15;$ $0.005 < (1/\nu p - 1/\nu ap)/(\phi 1/\phi tele) < 0.030;$ and $0.05 < \phi p/\phi 1 < 0.4,$ provided that, when a refractive index for g-line is denoted by Ng, a refractive index for C-line is denoted by NC, a refractive index for d-line is denoted by Nd, and a refractive index for F-line is denoted by NF, the following expressions are satisfied;

Abbe constant $v=(Nd-1)/(NF-NC)$

Partial dispersion ratio $\theta=(Nq-NF)/(NF-NC)$.

* * * * *